US012184012B2

(12) United States Patent
Cartier, Jr. et al.

(10) Patent No.: US 12,184,012 B2
(45) Date of Patent: Dec. 31, 2024

(54) HIGH SPEED, HIGH DENSITY ELECTRICAL CONNECTOR WITH SHIELDED SIGNAL PATHS PRELIMINARY CLASS

(71) Applicant: Amphenol Corporation, Wallingford, CT (US)

(72) Inventors: Marc B. Cartier, Jr., Durham, NH (US); John Robert Dunham, Windham, NH (US); Mark W. Gailus, Concord, MA (US); Donald A. Girard, Jr., Bedford, NH (US); David Manter, Goffstown, NH (US); Tom Pitten, Merrimack, NH (US); Vysakh Sivarajan, Nashua, NH (US); Michael Joseph Snyder, Merrimack, NH (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 18/335,472

(22) Filed: Jun. 15, 2023

(65) Prior Publication Data

US 2024/0030660 A1 Jan. 25, 2024

Related U.S. Application Data

(63) Continuation of application No. 17/102,133, filed on Nov. 23, 2020, now Pat. No. 11,715,914, which is a (Continued)

(51) Int. Cl.

*H01R 12/00* (2006.01)
*H01R 12/72* (2011.01)

(Continued)

(52) U.S. Cl.

CPC ....... *H01R 13/6598* (2013.01); *H01R 12/724* (2013.01); *H01R 12/737* (2013.01);

(Continued)

(58) Field of Classification Search

CPC ............ H01R 13/6598; H01R 13/6585; H01R 43/24; Y10T 29/4922

(Continued)

(56) References Cited

U.S. PATENT DOCUMENTS

| | | | |
|---|---|---|---|
| 4,632,476 | A | 12/1986 | Schell |
| 4,806,107 | A | 2/1989 | Arnold et al. |

(Continued)

FOREIGN PATENT DOCUMENTS

| | | | |
|---|---|---|---|
| CN | 2519434 | Y | 10/2002 |
| CN | 1491465 | A | 4/2004 |

(Continued)

OTHER PUBLICATIONS

International Search Report and Written Opinion for International Application No. PCT/US2015/012463 mailed May 13, 2015.

(Continued)

*Primary Examiner* — Phuong K Dinh
(74) *Attorney, Agent, or Firm* — Wolf, Greenfield & Sacks, P.C.

(57) ABSTRACT

A modular electrical connector with separately shielded signal conductor pairs. The connector may be assembled from modules, each containing a pair of signal conductors with surrounding partially or fully conductive material. Modules of different sizes may be assembled into wafers, which are then assembled into a connector. Wafers may include lossy material. In some embodiments, shielding members of two mating connectors may each have compliant members along their distal portions, such that, the shielding members engage at points of contact at multiple locations, some of which are adjacent the mating edge of each of the mating shielding members.

24 Claims, 22 Drawing Sheets

Related U.S. Application Data continuation of application No. 16/505,290, filed on Jul. 8, 2019, now Pat. No. 10,847,937, which is a continuation of application No. 15/713,887, filed on Sep. 25, 2017, now Pat. No. 10,348,040, which is a continuation of application No. 15/336,613, filed on Oct. 27, 2016, now Pat. No. 9,774,144, which is a continuation of application No. 14/603,294, filed on Jan. 22, 2015, now Pat. No. 9,509,101.

(60) Provisional application No. 62/078,945, filed on Nov. 12, 2014, provisional application No. 61/930,411, filed on Jan. 22, 2014.

(51) Int. Cl.

| | |
|---|---|
| ***H01R 12/73*** | (2011.01) |
| ***H01R 13/02*** | (2006.01) |
| ***H01R 13/518*** | (2006.01) |
| ***H01R 13/6585*** | (2011.01) |
| ***H01R 13/6587*** | (2011.01) |
| ***H01R 13/6598*** | (2011.01) |
| ***H01R 13/6599*** | (2011.01) |
| ***H01R 43/24*** | (2006.01) |

(52) U.S. Cl.
CPC ......... *H01R 13/025* (2013.01); *H01R 13/518* (2013.01); *H01R 13/6585* (2013.01); *H01R 13/6587* (2013.01); *H01R 13/6599* (2013.01); *H01R 43/24* (2013.01); *Y10T 29/4922* (2015.01); *Y10T 29/49222* (2015.01)

(58) Field of Classification Search
USPC ................................... 439/608, 79, 701, 108
See application file for complete search history.

(56) References Cited

U.S. PATENT DOCUMENTS 4,846,727 A 7/1989 Glover et al.
4,975,084 A 12/1990 Fedder et al.
5,066,236 A 11/1991 Broeksteeg
5,176,538 A 1/1993 Hansell, III et al.
5,334,050 A 8/1994 Andrews
5,429,520 A 7/1995 Morlion et al.
5,429,521 A 7/1995 Morlion et al.
5,433,617 A 7/1995 Morlion et al.
5,433,618 A 7/1995 Morlion et al.
5,484,310 A 1/1996 McNamara et al.
5,496,183 A 3/1996 Soes et al.
5,743,765 A 4/1998 Andrews et al.
6,293,827 B1 9/2001 Stokoe
6,299,438 B1 10/2001 Sahagian et al.
6,503,103 B1 1/2003 Cohen et al.
6,776,659 B1 8/2004 Stokoe et al.
7,163,421 B1 1/2007 Cohen et al.
7,407,413 B2 8/2008 Minich
7,494,383 B2 2/2009 Cohen et al.
7,540,781 B2 6/2009 Kenny et al.
7,554,096 B2 6/2009 Ward et al.
7,581,990 B2 * 9/2009 Kirk .................... H01R 13/514 439/607.05
7,585,186 B2 9/2009 McAlonis et al.
7,588,464 B2 9/2009 Kim
7,588,467 B2 9/2009 Chang
7,594,826 B2 9/2009 Kobayashi et al.
7,604,490 B2 10/2009 Chen et al.
7,604,502 B2 10/2009 Pan
7,674,133 B2 3/2010 Fogg et al.
7,690,946 B2 4/2010 Knaub et al.
7,699,663 B1 4/2010 Little et al.
7,722,401 B2 5/2010 Kirk et al.
7,731,537 B2 6/2010 Amleshi et al.
7,753,731 B2 7/2010 Cohen et al.
7,758,357 B2 7/2010 Pan et al.
7,771,233 B2 8/2010 Gailus
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,828,595 B2 11/2010 Mathews
7,833,068 B2 11/2010 Bright et al.
7,871,296 B2 1/2011 Fowler et al.
7,874,873 B2 1/2011 Do et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,927,143 B2 4/2011 Helster et al.
7,985,097 B2 7/2011 Gulla
8,018,733 B2 9/2011 Jia
8,057,267 B2 11/2011 Johnescu
8,083,553 B2 12/2011 Manter et al.
8,167,631 B2 5/2012 Ito et al.
8,182,289 B2 5/2012 Stokoe et al.
8,215,968 B2 7/2012 Cartier et al.
8,216,001 B2 7/2012 Kirk
8,251,745 B2 8/2012 Johnescu
8,267,721 B2 9/2012 Minich
8,272,877 B2 9/2012 Stokoe et al.
8,328,565 B2 12/2012 Westman et al.
8,348,701 B1 1/2013 Lan et al.
8,371,875 B2 2/2013 Gailus
8,382,524 B2 2/2013 Khilchenko et al.
8,545,240 B2 10/2013 Casher et al.
8,550,861 B2 10/2013 Cohen et al.
8,657,627 B2 2/2014 McNamara et al.
8,678,860 B2 3/2014 Minich et al.
8,715,003 B2 5/2014 Buck et al.
8,715,005 B2 5/2014 Pan
8,764,460 B2 7/2014 Smink et al.
8,764,488 B2 7/2014 Zeng
8,771,016 B2 7/2014 Atkinson et al.
8,864,521 B2 10/2014 Atkinson et al.
8,926,377 B2 1/2015 Kirk et al.
8,944,831 B2 2/2015 Stoner et al.
8,944,863 B1 2/2015 Yang
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,065,230 B2 6/2015 Milbrand, Jr.
9,077,115 B2 7/2015 Yang
9,083,130 B2 7/2015 Casher et al.
9,124,009 B2 9/2015 Atkinson et al.
9,166,317 B2 10/2015 Briant et al.
9,219,335 B2 12/2015 Atkinson et al.
9,225,083 B2 12/2015 Krenceski et al.
9,225,085 B2 12/2015 Cartier, Jr. et al.
9,257,778 B2 2/2016 Buck et al.
9,257,794 B2 2/2016 Wanha et al.
9,300,074 B2 3/2016 Gailus
9,401,570 B2 7/2016 Phillips et al.
9,450,344 B2 9/2016 Cartier, Jr. et al.
9,461,378 B1 10/2016 Chen
9,484,674 B2 11/2016 Cartier, Jr. et al.
9,490,585 B2 11/2016 Yang
9,490,587 B1 11/2016 Phillips et al.
9,509,101 B2 11/2016 Cartier, Jr. et al.
9,520,689 B2 12/2016 Cartier, Jr. et al.
9,634,432 B2 4/2017 Su et al.
9,692,183 B2 6/2017 Phillips
9,692,188 B2 6/2017 Godana et al.
9,705,218 B2 7/2017 Ito
9,705,255 B2 7/2017 Atkinson et al.
9,742,132 B1 8/2017 Hsueh
9,748,698 B1 8/2017 Morgan et al.
9,831,588 B2 11/2017 Cohen
9,843,135 B2 12/2017 Guetig et al.
9,899,774 B2 2/2018 Gailus
9,923,309 B1 3/2018 Aizawa et al.

(56) References Cited

U.S. PATENT DOCUMENTS

| | | | |
|---|---|---|---|
| 9,972,945 | B1 | 5/2018 | Huang et al. |
| 9,979,136 | B1 | 5/2018 | Wu et al. |
| 9,985,389 | B1 | 5/2018 | Morgan et al. |
| 10,038,284 | B2 | 7/2018 | Krenceski et al. |
| 10,096,921 | B2 | 10/2018 | Johnescu et al. |
| 10,122,129 | B2 | 11/2018 | Milbrand, Jr. et al. |
| 10,148,025 | B1 | 12/2018 | Trout et al. |
| 10,186,814 | B2 | 1/2019 | Khilchenko et al. |
| 10,211,577 | B2 | 2/2019 | Milbrand, Jr. et al. |
| 10,243,304 | B2 | 3/2019 | Kirk et al. |
| 10,270,191 | B1 | 4/2019 | Li et al. |
| 10,283,910 | B1 | 5/2019 | Chen et al. |
| 10,348,040 | B2 | 7/2019 | Cartier, Jr. et al. |
| 10,355,416 | B1 | 7/2019 | Pickel et al. |
| 10,381,767 | B1 | 8/2019 | Milbrand, Jr. et al. |
| 10,431,936 | B2 | 10/2019 | Horning et al. |
| 10,446,983 | B2 | 10/2019 | Krenceski et al. |
| 10,511,128 | B2 | 12/2019 | Kirk et al. |
| 10,601,181 | B2 | 3/2020 | Lu et al. |
| 10,777,921 | B2 | 9/2020 | Lu et al. |
| 10,797,417 | B2 | 10/2020 | Scholeno et al. |
| 10,847,936 | B2 | 11/2020 | Tang et al. |
| 10,916,894 | B2 | 2/2021 | Kirk et al. |
| 10,931,050 | B2 | 2/2021 | Cohen |
| 10,938,162 | B2 | 3/2021 | Lin |
| 10,965,063 | B2 | 3/2021 | Krenceski et al. |
| 11,189,971 | B2 | 11/2021 | Lu |
| 11,251,558 | B1 | 2/2022 | Lee |
| 11,316,307 | B2 | 4/2022 | Chen et al. |
| 11,381,039 | B2 | 7/2022 | Hsiao et al. |
| 11,469,553 | B2 | 10/2022 | Johnescu et al. |
| 11,469,554 | B2 | 10/2022 | Ellison et al. |
| 11,522,310 | B2 | 12/2022 | Cohen |
| 11,539,171 | B2 | 12/2022 | Kirk et al. |
| 11,600,950 | B2 | 3/2023 | Takai et al. |
| 11,715,914 | B2 | 8/2023 | Cartier, Jr. et al. |
| 11,757,224 | B2 | 9/2023 | Milbrand, Jr. et al. |
| 2002/0123266 | A1 | 9/2002 | Ramey et al. |
| 2004/0005815 | A1 | 1/2004 | Mizumura et al. |
| 2005/0233610 | A1 | 10/2005 | Tutt et al. |
| 2007/0042639 | A1 | 2/2007 | Manter et al. |
| 2007/0155241 | A1 | 7/2007 | Lappohn |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0318455 | A1 | 12/2008 | Beaman et al. |
| 2009/0011641 | A1 | 1/2009 | Cohen et al. |
| 2009/0011643 | A1 | 1/2009 | Amleshi et al. |
| 2009/0011645 | A1 | 1/2009 | Laurx et al. |
| 2009/0029602 | A1 | 1/2009 | Cohen et al. |
| 2009/0035955 | A1 | 2/2009 | McNamara |
| 2009/0061661 | A1 | 3/2009 | Shuey et al. |
| 2009/0117386 | A1 | 5/2009 | Vacanti et al. |
| 2009/0124101 | A1 | 5/2009 | Minich et al. |
| 2009/0149045 | A1 | 6/2009 | Chen et al. |
| 2009/0203259 | A1 | 8/2009 | Nguyen et al. |
| 2009/0239395 | A1 | 9/2009 | Cohen et al. |
| 2009/0258516 | A1 | 10/2009 | Hiew et al. |
| 2009/0291593 | A1 | 11/2009 | Atkinson et al. |
| 2009/0305530 | A1 | 12/2009 | Ito et al. |
| 2009/0305533 | A1 | 12/2009 | Feldman et al. |
| 2009/0305553 | A1 | 12/2009 | Thomas et al. |
| 2010/0048058 | A1 | 2/2010 | Morgan et al. |
| 2010/0081302 | A1 | 4/2010 | Atkinson et al. |
| 2010/0099299 | A1 | 4/2010 | Moriyama et al. |
| 2010/0144167 | A1 | 6/2010 | Fedder et al. |
| 2010/0273359 | A1 | 10/2010 | Walker et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0067237 | A1 | 3/2011 | Cohen et al. |
| 2011/0104948 | A1 | 5/2011 | Girard, Jr. et al. |
| 2011/0130038 | A1 | 6/2011 | Cohen et al. |
| 2011/0212649 | A1 | 9/2011 | Stokoe et al. |
| 2011/0212650 | A1 | 9/2011 | Amleshi et al. |
| 2011/0230095 | A1 | 9/2011 | Atkinson et al. |
| 2011/0230096 | A1 | 9/2011 | Atkinson et al. |
| 2011/0256739 | A1 | 10/2011 | Toshiyuki et al. |
| 2011/0287663 | A1 | 11/2011 | Gailus et al. |
| 2012/0077380 | A1 | 3/2012 | Minich et al. |
| 2012/0094536 | A1 | 4/2012 | Khilchenko et al. |
| 2012/0115371 | A1 | 5/2012 | Chuang et al. |
| 2012/0156929 | A1 | 6/2012 | Manter et al. |
| 2012/0184154 | A1 | 7/2012 | Frank et al. |
| 2012/0202363 | A1 | 8/2012 | McNamara et al. |
| 2012/0202386 | A1 | 8/2012 | McNamara et al. |
| 2012/0202387 | A1 | 8/2012 | McNamara |
| 2012/0214343 | A1 | 8/2012 | Buck et al. |
| 2012/0214344 | A1 | 8/2012 | Cohen et al. |
| 2013/0012038 | A1 | 1/2013 | Kirk et al. |
| 2013/0017733 | A1 | 1/2013 | Kirk et al. |
| 2013/0065454 | A1 | 3/2013 | Milbrand, Jr. |
| 2013/0078870 | A1 | 3/2013 | Milbrand, Jr. |
| 2013/0078871 | A1 | 3/2013 | Milbrand, Jr. |
| 2013/0090001 | A1 | 4/2013 | Kagotani |
| 2013/0109232 | A1 | 5/2013 | Paniaqua |
| 2013/0143442 | A1 | 6/2013 | Cohen et al. |
| 2013/0196553 | A1 | 8/2013 | Gailus |
| 2013/0217263 | A1* | 8/2013 | Pan .................... H01R 13/6587 439/607.07 |
| 2013/0225006 | A1 | 8/2013 | Khilchenko et al. |
| 2013/0237092 | A1 | 9/2013 | Rubens |
| 2013/0273781 | A1 | 10/2013 | Buck et al. |
| 2013/0288513 | A1 | 10/2013 | Masubuchi et al. |
| 2013/0316590 | A1 | 11/2013 | Hon |
| 2013/0340251 | A1 | 12/2013 | Regnier et al. |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0057498 | A1 | 2/2014 | Cohen |
| 2014/0273557 | A1 | 9/2014 | Cartier, Jr. et al. |
| 2014/0273627 | A1 | 9/2014 | Cartier, Jr. et al. |
| 2015/0056856 | A1 | 2/2015 | Atkinson et al. |
| 2015/0111427 | A1 | 4/2015 | Wu et al. |
| 2015/0188250 | A1 | 7/2015 | Liu et al. |
| 2015/0236451 | A1 | 8/2015 | Cartier, Jr. et al. |
| 2015/0236452 | A1 | 8/2015 | Cartier, Jr. et al. |
| 2015/0255926 | A1 | 9/2015 | Paniagua |
| 2015/0380868 | A1 | 12/2015 | Chen et al. |
| 2016/0000616 | A1 | 1/2016 | Lavoie |
| 2016/0134057 | A1 | 5/2016 | Buck et al. |
| 2016/0149343 | A1 | 5/2016 | Atkinson et al. |
| 2016/0156133 | A1 | 6/2016 | Masubuchi et al. |
| 2016/0172794 | A1 | 6/2016 | Sparrowhawk et al. |
| 2016/0211618 | A1 | 7/2016 | Gailus |
| 2017/0047692 | A1 | 2/2017 | Cartier et al. |
| 2017/0352970 | A1 | 12/2017 | Liang et al. |
| 2018/0062323 | A1 | 3/2018 | Kirk et al. |
| 2018/0109043 | A1 | 4/2018 | Provencher et al. |
| 2018/0145438 | A1 | 5/2018 | Cohen |
| 2018/0166828 | A1 | 6/2018 | Gailus |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0219331 | A1 | 8/2018 | Cartier, Jr. et al. |
| 2018/0269607 | A1 | 9/2018 | Wu et al. |
| 2019/0036256 | A1 | 1/2019 | Martens et al. |
| 2019/0052019 | A1 | 2/2019 | Huang et al. |
| 2019/0067854 | A1 | 2/2019 | Ju et al. |
| 2019/0131743 | A1 | 5/2019 | Hsu et al. |
| 2019/0173209 | A1 | 6/2019 | Lu et al. |
| 2019/0173232 | A1 | 6/2019 | Lu et al. |
| 2019/0221973 | A1 | 7/2019 | Kirk et al. |
| 2019/0312389 | A1 | 10/2019 | Little |
| 2019/0334292 | A1 | 10/2019 | Cartier, Jr. et al. |
| 2020/0021052 | A1 | 1/2020 | Milbrand, Jr. et al. |
| 2020/0076132 | A1 | 3/2020 | Yang et al. |
| 2020/0161811 | A1 | 5/2020 | Lu |
| 2020/0194940 | A1 | 6/2020 | Cohen et al. |
| 2020/0212632 | A1 | 7/2020 | Liong et al. |
| 2020/0220289 | A1 | 7/2020 | Scholeno et al. |
| 2020/0235529 | A1 | 7/2020 | Kirk et al. |
| 2020/0251841 | A1 | 8/2020 | Stokoe et al. |

(56) References Cited

U.S. PATENT DOCUMENTS

| | | | |
|---|---|---|---|
| 2020/0259294 | A1 | 8/2020 | Lu |
| 2020/0266584 | A1 | 8/2020 | Lu |
| 2020/0266585 | A1 | 8/2020 | Paniagua et al. |
| 2020/0315027 | A1 | 10/2020 | Muronoi et al. |
| 2020/0350717 | A1 | 11/2020 | Dong et al. |
| 2020/0350732 | A1 | 11/2020 | Hsueh et al. |
| 2020/0395698 | A1 | 12/2020 | Hou et al. |
| 2020/0403350 | A1 | 12/2020 | Hsu |
| 2020/0412060 | A1 | 12/2020 | Hsieh et al. |
| 2021/0036465 | A1 | 2/2021 | Tang et al. |
| 2021/0050683 | A1 | 2/2021 | Sasame et al. |
| 2021/0159643 | A1 | 5/2021 | Kirk et al. |
| 2021/0175670 | A1 | 6/2021 | Cartier, Jr. et al. |
| 2021/0194187 | A1 | 6/2021 | Chen et al. |
| 2021/0203096 | A1 | 7/2021 | Cohen |
| 2021/0234314 | A1 | 7/2021 | Johnescu et al. |
| 2021/0234315 | A1 | 7/2021 | Ellison et al. |
| 2021/0242632 | A1 | 8/2021 | Trout et al. |
| 2021/0320461 | A1 | 10/2021 | Buck et al. |
| 2021/0336362 | A1 | 10/2021 | Shen et al. |
| 2022/0094099 | A1 | 3/2022 | Liu et al. |
| 2022/0102916 | A1 | 3/2022 | Liu et al. |
| 2022/0399663 | A1 | 12/2022 | Chang et al. |
| 2022/0407269 | A1 | 12/2022 | Ellison et al. |
| 2023/0062661 | A1 | 3/2023 | Johnescu et al. |
| 2023/0099389 | A1 | 3/2023 | Cohen |
| 2023/0128519 | A1 | 4/2023 | Kirk et al. |

FOREIGN PATENT DOCUMENTS

| | | | |
|---|---|---|---|
| CN | 1650479 | A | 8/2005 |
| CN | 101208837 | A | 6/2008 |
| CN | 101312275 | A | 11/2008 |
| CN | 101316012 | A | 12/2008 |
| CN | 201222548 | Y | 4/2009 |
| CN | 201252183 | | 6/2009 |
| CN | 101552410 | A | 10/2009 |
| CN | 101600293 | A | 12/2009 |
| CN | 201374433 | | 12/2009 |
| CN | 101752700 | A | 6/2010 |
| CN | 101790818 | A | 7/2010 |
| CN | 101120490 | B | 11/2010 |
| CN | 101964463 | A | 2/2011 |
| CN | 101124697 | B | 3/2011 |
| CN | 201846527 | U | 5/2011 |
| CN | 102106041 | A | 6/2011 |
| CN | 102195173 | A | 9/2011 |
| CN | 102232259 | A | 11/2011 |
| CN | 102239605 | A | 11/2011 |
| CN | 102282731 | A | 12/2011 |
| CN | 102292881 | A | 12/2011 |
| CN | 101600293 | B | 5/2012 |
| CN | 102570100 | A | 7/2012 |
| CN | 102598430 | A | 7/2012 |
| CN | 101258649 | B | 9/2012 |
| CN | 102738621 | A | 10/2012 |
| CN | 102176586 | B | 11/2012 |
| CN | 102859805 | A | 1/2013 |
| CN | 202695788 | U | 1/2013 |
| CN | 202695861 | U | 1/2013 |
| CN | 102986091 | A | 3/2013 |
| CN | 103036081 | A | 4/2013 |
| CN | 103594871 | A | 2/2014 |
| CN | 204190038 | U | 3/2015 |
| CN | 104577577 | A | 4/2015 |
| CN | 205212085 | U | 5/2016 |
| CN | 102820589 | B | 8/2016 |
| CN | 106099546 | A | 11/2016 |
| CN | 107069274 | A | 8/2017 |
| CN | 107069293 | A | 8/2017 |
| CN | 304240766 | S | 8/2017 |
| CN | 304245430 | S | 8/2017 |
| CN | 206712089 | U | 12/2017 |
| CN | 207677189 | U | 7/2018 |
| CN | 108832338 | A | 11/2018 |
| CN | 109994892 | A | 7/2019 |
| CN | 111555069 | A | 8/2020 |
| CN | 112134095 | A | 12/2020 |
| CN | 213636403 | U | 7/2021 |
| EP | 0560551 | A1 | 9/1993 |
| EP | 2169770 | A2 | 3/2010 |
| EP | 2262061 | A1 | 12/2010 |
| EP | 2388867 | A2 | 11/2011 |
| EP | 2405537 | A1 | 1/2012 |
| EP | 1794845 | B1 | 3/2013 |
| JP | 2009-043717 | A | 2/2009 |
| JP | 2009-110956 | A | 5/2009 |
| TW | M357771 | U | 5/2009 |
| TW | 200926536 | | 6/2009 |
| TW | M403141 | U | 5/2011 |
| TW | M494411 | U | 1/2015 |
| TW | I475770 | B | 3/2015 |
| TW | M518837 | U | 3/2016 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | 201820724 | A | 6/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M623128 | U | 2/2022 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/060236 | A1 | 5/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/106554 | A2 | 8/2012 |
| WO | WO 2013/059317 | A1 | 4/2013 |
| WO | WO 2015/112717 | A1 | 7/2015 |
| WO | WO 2016/008473 | A1 | 1/2016 |
| WO | WO 2018/039164 | A1 | 3/2018 |

OTHER PUBLICATIONS

Chinese Office Action for Chinese Application No. 201580014851.4 dated Sep. 4, 2019.

Chinese communication for Chinese Application No. 201580014851.4, dated Jun. 1, 2020.

Chinese Office Action for Chinese Application No. 202010825662.8 dated Sep. 3, 2021.

[No Author Listed], Cable Systems. Samtec. Aug. 2010. 148 pages.

[No Author Listed], Common Management Interface Specification. Rev 4.0. MSA Group. May 8, 2019. 265 pages.

[No Author Listed], Electronics Connector Overview. FCI. Sep. 23, 2009. 78 pages.

[No Author Listed], EMI Shielding Compounds Instead of Metal. RTP Company. Last Accessed Apr. 30, 2021. 2 pages.

[No Author Listed], EMI Shielding Solutions and EMC Testing Services from Laird Technologies. Laird Technologies. Last accessed Apr. 30, 2021. 1 page.

[No Author Listed], FCI—High Speed Interconnect Solutions, Backpanel Connectors. FCI. [last accessed Apr. 30, 2021). 2 pages.

[No Author Listed], HOZOX EMI Absorption Sheet and Tape. Molex. Laird Technologies. 2013. 2 pages.

[No Author Listed], Molex Connectors as InfiniBand Solutions. Design World. Nov. 19, 2008. 7 pages. https://www.designworldonline.com/molex-connectors-as-infiniband-solutions/. [last accessed May 3, 2021].

(56) References Cited

OTHER PUBLICATIONS

[No Author Listed], OSFP MSA Specification for OSFP Octal Small Form Factor Pluggable Module. Revision 3.0 OSFP MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Input/Output Solutions. Tyco Electronics Catalog 1773408-1. Revised Feb. 2009. 40 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company—EMI/RFI Shielding Compounds (Conductive) Data Sheets. RTP Company. Last accessed Apr. 30, 2021. 4 pages.
[No Author Listed], SFF Committee SFF-8436 Specification for QSFP+ 4X 10 Gb/s Pluggable Transceiver. Revision 4.9. SFF Committee. Aug. 31, 2018. 88 pages.
[No Author Listed], SFF Committee SFF-8665 Specification for QSFP+ 28 Gb/s 4X Pluggable Transceiver Solution (QSFP28). Revision 1.9. SFF Committee. Jun. 29, 2015. 14 pages.
[No Author Listed], SFF-8431 Specifications for Enhanced Small Form Factor Pluggable Module SFP+. Revision 4.1. SFF Committee. Jul. 6, 2009. 132 pages.
[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 Gb/s Connector (Style B). Revision 1.2. SNIA. Jun. 8, 2018. 21 pages.
[No Author Listed], SFF-8679 Specification for QSFP+ 4X Base Electrical Specification. Rev 1.7. SFF Committee. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
Atkinson et al., High Frequency Electrical Connector, U.S. Appl. No. 15/645,931, filed Jul. 10, 2017.
Do et al., A Novel Concept Utilizing Conductive Polymers on Power Connectors During Hot Swapping in Live Modular Electronic Systems. IEEE Xplore 2005; downloaded Feb. 18, 2021;340-345.
McAlexander, CV of Joseph C. McAlexander III . Exhibit 1009. 2021. 31 pages.
McAlexander, Declaration of Joseph C. McAlexander III in Support of Petition for Inter Partes Review of U.S. Pat. No. 10,381,767. Exhibit 1002. Nov. 4, 2021. 85 pages.
Milbrand et al., High Performance Cable Connector, U.S. Appl. No. 18/449,520, filed Aug. 14, 2023.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.
Zeng, High Speed Electrical Connector With High Manufacturing Tolerance, U.S. Appl. No. 18/318,890, filed May 17, 2023.
U.S. Appl. No. 16/795,398, filed Feb. 19, 2020, Paniagua et al.
U.S. Appl. No. 17/477,352, filed Sep. 16, 2021, Liu et al.
U.S. Appl. No. 17/477,391, filed Sep. 16, 2021, Liu et al.
U.S. Appl. No. 17/894,944, filed Aug. 24, 2022, Ellison et al.
U.S. Appl. No. 17/902,342, filed Sep. 2, 2022, Johnescu et al.
U.S. Appl. No. 18/075,313, filed Dec. 5, 2022, Cohen.
U.S. Appl. No. 18/085,093, filed Dec. 20, 2022, Kirk et al.
U.S. Appl. No. 18/318,890, filed May 17, 2023, Zeng.
U.S. Appl. No. 18/449,520, filed Aug. 14, 2023, Milbrand et al.
PCT/US2015/012463, May 13, 2015, International Search Report and Written Opinion.
CN 201580014851.4, Sep. 4, 2019, Chinese Office Action.
CN 201580014851.4, Jun. 1, 2020, Chinese communication.
CN 202010825662.8, Sep. 3, 2021, Chinese Office Action.

* cited by examiner

HIGH SPEED, HIGH DENSITY ELECTRICAL CONNECTOR WITH SHIELDED SIGNAL PATHS PRELIMINARY CLASS

RELATED APPLICATIONS

This Application is a continuation of U.S. patent application Ser. No. 17/102,133, entitled "HIGH SPEED, HIGH DENSITY ELECTRICAL CONNECTOR WITH SHIELDED SIGNAL PATHS" filed on Nov. 23, 2020, which is a continuation of U.S. patent application Ser. No. 16/505,290, entitled "HIGH SPEED, HIGH DENSITY ELECTRICAL CONNECTOR WITH SHIELDED SIGNAL PATHS" filed on Jul. 8, 2019, which is a continuation of U.S. patent application Ser. No. 15/713,887, entitled "HIGH SPEED, HIGH DENSITY ELECTRICAL CONNECTOR WITH SHIELDED SIGNAL PATHS" filed on Sep. 25, 2017, which is a continuation of U.S. patent application Ser. No. 15/336,613, entitled "HIGH SPEED, HIGH DENSITY ELECTRICAL CONNECTOR WITH SHIELDED SIGNAL PATHS" filed on Oct. 27, 2016, which is a continuation of U.S. patent application Ser. No. 14/603,294, entitled "HIGH SPEED, HIGH DENSITY ELECTRICAL CONNECTOR WITH SHIELDED SIGNAL PATHS" filed on Jan. 22, 2015, which claims priority under 35 U.S.C. § 119(e) to U.S. Provisional Application Ser. No. 61/930,411, entitled "HIGH SPEED, HIGH DENSITY ELECTRICAL CONNECTOR WITH SHIELDED SIGNAL PATHS" filed on Jan. 22, 2014 and to U.S. Provisional Application Ser. No. 62/078,945, entitled "VERY HIGH SPEED, HIGH DENSITY ELECTRICAL INTERCONNECTION SYSTEM WITH IMPEDANCE CONTROL IN MATING REGION" filed on Nov. 12, 2014. The entire contents of these applications are incorporated herein by reference in their entirety.

BACKGROUND

This invention relates generally to electrical connectors used to interconnect electronic assemblies.

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughter boards" or "daughter cards," may be connected through the backplane.

A known backplane is a printed circuit board onto which many connectors may be mounted. Conducting traces in the backplane may be electrically connected to signal conductors in the connectors so that signals may be routed between the connectors. Daughter cards may also have connectors mounted thereon. The connectors mounted on a daughter card may be plugged into the connectors mounted on the backplane. In this way, signals may be routed among the daughter cards through the backplane. The daughter cards may plug into the backplane at a right angle. The connectors used for these applications may therefore include a right angle bend and are often called "right angle connectors."

Connectors may also be used in other configurations for interconnecting printed circuit boards and for interconnecting other types of devices, such as cables, to printed circuit boards. Sometimes, one or more smaller printed circuit boards may be connected to another larger printed circuit board. In such a configuration, the larger printed circuit board may be called a "mother board" and the printed circuit boards connected to it may be called daughter boards. Also, boards of the same size or similar sizes may sometimes be aligned in parallel. Connectors used in these applications are often called "stacking connectors" or "mezzanine connectors."

Regardless of the exact application, electrical connector designs have been adapted to mirror trends in the electronics industry. Electronic systems generally have gotten smaller, faster, and functionally more complex. Because of these changes, the number of circuits in a given area of an electronic system, along with the frequencies at which the circuits operate, have increased significantly in recent years. Current systems pass more data between printed circuit boards and require electrical connectors that are electrically capable of handling more data at higher speeds than connectors of even a few years ago.

In a high density, high speed connector, electrical conductors may be so close to each other that there may be electrical interference between adjacent signal conductors. To reduce interference, and to otherwise provide desirable electrical properties, shield members are often placed between or around adjacent signal conductors. The shields may prevent signals carried on one conductor from creating "crosstalk" on another conductor. The shield may also impact the impedance of each conductor, which may further contribute to desirable electrical properties.

Examples of shielding can be found in U.S. Pat. Nos. 4,632,476 and 4,806,107, which show connector designs in which shields are used between columns of signal contacts. These patents describe connectors in which the shields run parallel to the signal contacts through both the daughter board connector and the backplane connector. Cantilevered beams are used to make electrical contact between the shield and the backplane connectors. U.S. Pat. Nos. 5,433,617, 5,429,521, 5,429,520, and 5,433,618 show a similar arrangement, although the electrical connection between the backplane and shield is made with a spring type contact. Shields with torsional beam contacts are used in the connectors described in U.S. Pat. No. 6,299,438. Further shields are shown in U.S. Pre-grant Publication 2013-0109232.

Other connectors have the shield plate within only the daughter board connector. Examples of such connector designs can be found in U.S. Pat. Nos. 4,846,727, 4,975,084, 5,496,183, and 5,066,236. Another connector with shields only within the daughter board connector is shown in U.S. Pat. No. 5,484,310. U.S. Pat. No. 7,985,097 is a further example of a shielded connector.

Other techniques may be used to control the performance of a connector. For instance, transmitting signals differentially may also reduce crosstalk. Differential signals are carried on a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector. No shielding is desired between the conducting paths of the pair, but shielding may be used between differential pairs. Electrical connectors can be designed for differential signals as well as for single-ended signals. Examples of differential electrical connectors are shown in U.S. Pat. Nos. 6,293,827, 6,503,103, 6,776,659, 7,163,421, and 7,794,278.

Another modification made to connectors to accommodate changing requirements is that connectors have become much larger in some applications. Increasing the size of a connector may lead to manufacturing tolerances that are much tighter. For instance, the permissible mismatch between the conductors in one half of a connector and the receptacles in the other half may be constant, regardless of the size of the connector. However, this constant mismatch, or tolerance, may become a decreasing percentage of the connector's overall length as the connector gets longer. Therefore, manufacturing tolerances may be tighter for larger connectors, which may increase manufacturing costs. One way to avoid this problem is to use modular connectors. Teradyne Connection Systems of Nashua, NH, USA pioneered a modular connector system called HD+®. This system has multiple modules, each having multiple columns of signal contacts, such as 15 or 20 columns. The modules are held together on a metal stiffener.

Another modular connector system is shown in U.S. Pat. Nos. 5,066,236 and 5,496,183. Those patents describe "module terminals" each having a single column of signal contacts. The module terminals are held in place in a plastic housing module. The plastic housing modules are held together with a one-piece metal shield member. Shields may be placed between the module terminals as well.

SUMMARY

In some aspects, an electrical connector comprises modules disposed in a two-dimensional array with shielding material separating adjacent modules.

In some embodiments, the modules comprise a cable.

In a further aspect, an electrical connector may comprise conductive walls adjacent mating contact portions of conductive elements within the connector. The walls have compliant members and contact surfaces.

In accordance with some embodiments, an electrical connector is provided comprising: a plurality of modules, each of the plurality of modules comprising an insulative portion and at least one conductive element; and electromagnetic shielding material, wherein: the insulative portion separates the at least one conductive element from the electromagnetic shielding material; the plurality of modules are disposed in a two-dimensional array; and the shielding material separates adjacent modules of the plurality of modules.

In some embodiments, the shielding material comprises metal.

In some embodiments, the shielding material comprises lossy material.

In some embodiments, the lossy material comprises an insulative matrix holding conductive particles.

In some embodiments, the lossy material is overmolded on at least a portion of the modules.

In some embodiments, the plurality of modules comprises a plurality of modules of a first type, a plurality of modules of a second type, and a plurality of modules of a third type, wherein the modules of the second type are longer than the modules of the first type, and the modules of the third type are longer than the modules of the second type.

In some embodiments, the modules of the first type are disposed in a first row; the modules of the second type are disposed in a second row, the second row being parallel to and adjacent the first row; and the modules of the third type are disposed in a third row, the third row being parallel to and adjacent the second row.

In some embodiments, the plurality of the modules are assembled into a plurality of wafers that are positioned side by side, each of the plurality of wafers comprising a module of the first type, a module of the second type, and a module of the third type.

In some embodiments, the electromagnetic shielding material comprises a plurality of shielding members; each of the plurality of shielding members is attached to a module of the plurality of modules; and for each of the plurality of wafers, at least one first shield member attached to a first module of the wafer is electrically connected to at least one second shield member attached to a second module of the wafer.

In some embodiments, the electromagnetic shielding material comprises a plurality of shielding members; and each of the plurality of shielding members is attached to a module of the plurality of modules.

In some embodiments, the at least one conductive element is a pair of conductive elements configured to carry a differential signal.

In some embodiments, the at least one conductive element is a single conductive element configured to carry a single-ended signal.

In some embodiments, the shielding material comprises metallized plastic.

In some embodiments, the electrical connector further comprising a support member, wherein the plurality of modules are supported by the support member.

In some embodiments, the at least one conductive element passes through the insulative portion.

In some embodiments, the at least one conductive element is pressed onto the insulative portion.

In some embodiments, the at least one conductive element comprises a conductive wire; the insulative portion comprises a passageway; and the wire is routed through the passageway.

In some embodiments, the insulative portion is formed by molding; and the wire is threaded through the passageway after the insulative portion has been molded.

In some embodiments, the shielding material comprises a first shield member and a second shield member disposed on opposing sides of a module.

In some embodiments, the electrical connector further comprises at least one lossy portion disposed between the first and second shield members.

In some embodiments, the at least one lossy portion is elongated and runs along an entire length of the first shield member.

In some embodiments, the at least one conductive element of a module comprises a contact tail, a mating interface portion, and an intermediate portion electrically connecting the contact tail and the mating interface portion; the shielding material comprises at least two shield members disposed adjacent the module, the at least two shield members together cover four sides of the module along the intermediate portion.

In some embodiments, the shielding material comprises a shield member having a U-shaped cross-section.

In some embodiments, for each module, the at least one conductive element of the module comprises a contact tail adapted to be inserted into a printed circuit board; the contact tails of the plurality of modules are aligned in a plane; and the electrical connector further comprises an organizer having a plurality of openings that are sized and arranged to receive the contact tails.

In some embodiments, the organizer is adapted to occupy space between the electrical connector and a surface of a printed circuit board when the electrical connector is mounted to the printed circuit board.

In some embodiments, the organizer comprises a flat surface for mounting against the printed circuit board and an opposing surface having a profile adapted to match a profile of the plurality of modules.

In accordance with some embodiments, an electrical connector is provided, comprising: a plurality of modules held in a two dimensional array, each of the plurality of modules comprising: a cable comprising a first end and a second end, the cable comprising a pair of conductive elements extending from the first end to the second end and a ground structure disposed around the pair of conductive elements; a contact tail attached to each conductive element of the pair of conductive elements at the first end of the cable; and a mating contact portion attached to each conductive element of the pair of conductive elements at the second end of the cable.

In some embodiments, the electrical connector further comprises an insulative portion at the first end of the cable, wherein the contact tails of the pair of conductive elements are attached to the insulative portion.

In some embodiments, the contact tails of the pair of conductive elements are positioned for edge coupling.

In some embodiments, the electrical connector further comprises a conductive structure at the first end of the cable, wherein the conductive structure surrounds the insulative portion.

In some embodiments, the electrical connector further comprises: a lossy member attached to the conductive structure.

In some embodiments, the electrical connector further comprises an insulative portion at the second end of the cable, wherein the mating contact portions of the pair of conductive elements are attached to the insulative portion.

In some embodiments, each of the mating contact portions of the pair of conductive elements comprises a tubular mating contact.

In some embodiments, the electrical connector further comprises a conductive structure at the second end of the cable, wherein the conductive structure surrounds the insulative portion.

In some embodiments, the electrical connector further comprises a plurality of compliant members at the second end of the cable, wherein the plurality of compliant members are attached to the conductive structure.

In accordance with some embodiments, an electrical connector is provided, comprising: a plurality of conductive elements, each of the plurality of conductive elements comprising a mating contact portion, wherein the mating contact portions are disposed to define a mating interface of the electrical connector; a plurality of conductive walls adjacent the mating contact portions of the plurality of conductive elements, each of the plurality of conduct walls comprising a forward edge adjacent the mating interface, and the plurality of conductive walls being disposed to define a plurality regions, each of the plurality of regions containing at least one of the mating contact portions and being separated from adjacent regions by walls of the plurality of conductive walls, a plurality of compliant members attached to the plurality of conductive walls, the plurality of compliant members being positioned adjacent the forward edge, wherein: the walls bounding each of the plurality of regions comprise at least two of the plurality of compliant members; and the walls bounding each of the plurality of regions comprise at least two contact surfaces, the at least two contact surfaces being set back from the forward edge and adapted for making electrical contact with a compliant member from a mating electrical connector.

In some embodiments, the electrical connector is a first electrical connector; the plurality of conductive elements are first conductive elements, the mating contact portions are first mating contact portions, the mating interface is a first mating interface, the plurality of conductive walls is a plurality of first conductive walls, the forward edge is a first forward edge, the plurality of regions is a plurality of first regions, and the contact surfaces are first contact surfaces; the first electrical connector is in combination with a second electrical connector: and the second electrical connector comprises: a plurality of second conductive elements, each of the plurality of second conductive elements comprising a second mating contact portion, wherein the second mating contact portions are disposed to define a second mating interface of the second electrical connector; a plurality of second conductive walls adjacent the second mating contact portions, each of the plurality of second conductive walls comprising a second forward edge adjacent the second mating interface, and the plurality of second conductive walls being disposed to define a plurality of second regions, each of the plurality of second regions containing at least one of the second mating contact portions and being separated from adjacent second regions by walls of the plurality of second conductive walls; and a plurality of second compliant members attached to the plurality of second conductive walls, the plurality of second compliant members being positioned adjacent the second forward edge, wherein: the walls bounding each of the plurality of second regions comprise at least two of the plurality of second compliant members; the walls bounding each of the plurality of second regions comprise at least two second contact surfaces, the at least two second contact surfaces being set back from the second forward edge; when the first electrical connector is mated with the second electrical connector, each of the first regions corresponds to a respective second region; and for each first region and the corresponding second region, the first compliant members of the first region make contact with the second contact surfaces of the second region and the second compliant members of the second region make contact with the first contact surfaces of the first region.

In some embodiments, the plurality of compliant members attached to the plurality of conductive walls comprise discrete compliant members joined to the conductive walls.

In accordance with some embodiments, a method for manufacturing an electrical connector is provided, the method comprising acts of: forming a plurality of modules, each of the plurality of modules comprising an insulative portion and at least one conductive element; arranging the plurality of modules in a two-dimensional array, comprising using electromagnetic shielding material to separate adjacent modules of the plurality of modules, wherein the insulative portion separates the at least one conductive element from the electromagnetic shielding material.

In some embodiments, the shielding material comprises lossy material, and the method further comprises an act of: overmolding the lossy material on at least a portion of the modules.

In some embodiments, the plurality of modules comprises a plurality of modules of a first type, a plurality of modules of a second type, and a plurality of modules of a third type, and wherein the modules of the second type are longer than the modules of the first type, and the modules of the third type are longer than the modules of the second type.

In some embodiments, the act of arranging the plurality of modules comprises: arranging the modules of the first type in a first row; arranging the modules of the second type in a second row, the second row being parallel to and adjacent the first row; and arranging the modules of the third type in a third row, the third row being parallel to and adjacent the second row.

In some embodiments, the method further comprises an act of: assembling the plurality of the modules into a plurality of wafers; and arranging the plurality of wafers side by side, each of the plurality of wafers comprising a module of the first type, a module of the second type, and a module of the third type.

In some embodiments, the at least one conductive element comprises a conductive wire and the insulative portion comprises a passageway, and wherein the method further comprises an act of: threading the conductive wire through the passageway.

In some embodiments, the method further comprises an act of: prior to threading the conductive wire through the passageway, forming the insulative portion by molding.

The foregoing is a non-limiting summary of the invention.

DESCRIPTION OF THE PREFERRED EMBODIMENT

Designs of an electrical connector are described herein that improve signal integrity for high frequency signals, such as at frequencies in the GHz range, including up to about 25 GHz or up to about 40 GHz or higher, while maintaining high density, such as with a spacing between adjacent mating contacts on the order of 2 mm or less, including center-to-center spacing between adjacent contacts in a column of between 0.75 mm and 1.85 mm, between 1 mm and 1.75 mm, or between 2 mm and 2.5 mm (e.g., 2.40 mm), for example. Spacing between columns of mating contact portions may be similar, although there is no requirement that the spacing between all mating contacts in a connector be the same.

The present disclosure is not limited to the details of construction or the arrangements of components set forth in the following description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

Figure 1A:
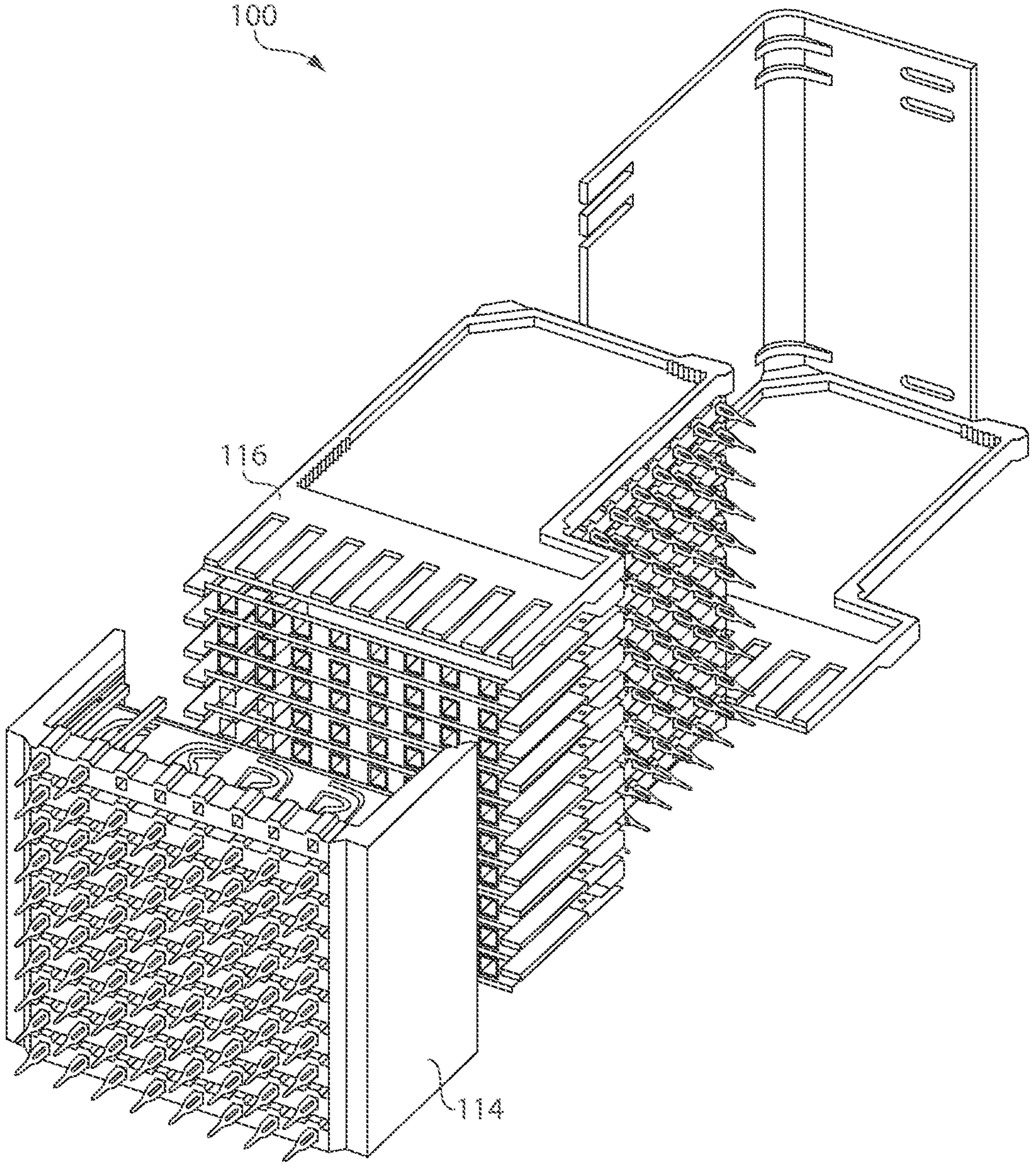
FIG. 1A is an isometric view of an illustrative electrical interconnection system, in accordance with some embodiments.
Figure 1B:
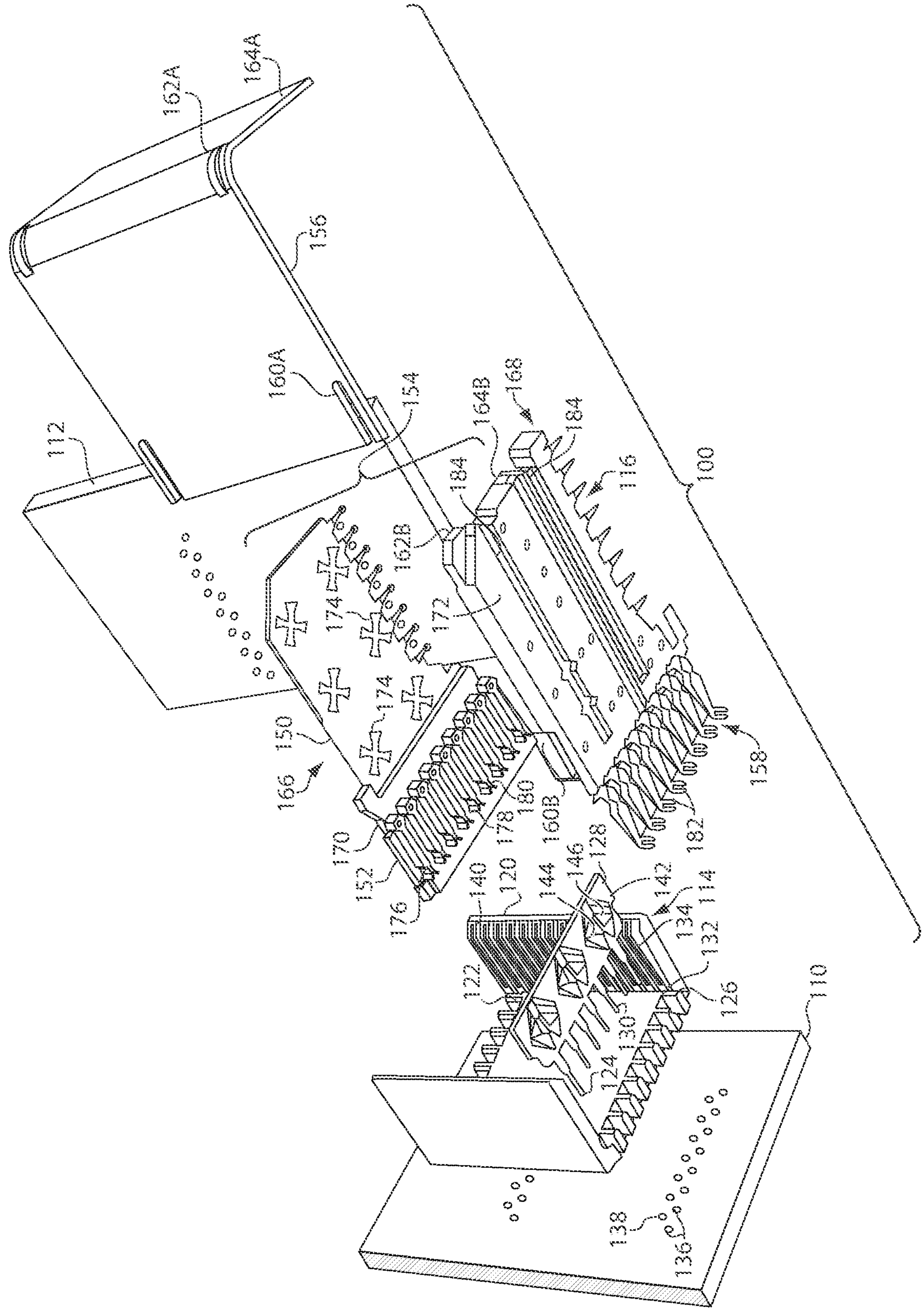
FIG. 1B is an exploded view of the illustrative electrical interconnection system shown in FIG. 1A, in accordance with some embodiments.

FIGS. 1A-B illustrate an electrical interconnection system of the form that may be used in an electronic system. In this example, the electrical interconnection system includes a right angle connector and may be used, for example, in electrically connecting a daughter card to a backplane. These figures illustrate two mating connectors—one designed to attach to a daughter card and one designed to attach to a backplane. As can be seen in FIG. 1A, each of the connectors includes contact tails, which are shaped for attachment to a printed circuit board. Each of the connectors also has a mating interface where that connector can mate—or be separated from—the other connector. Numerous conductors extend through a housing for each connector. Each of these conductors connects a contact tail to a mating contact portion.

FIG. 1A is an isometric view of an illustrative electrical interconnection system 100, in accordance with some embodiments. In this example, the electrical interconnection system 100 includes a backplane connector 114 and a daughter card connector 116 adapted to mate with each other.

FIG. 1B shows an exploded view of the illustrative electrical interconnection system 100 shown in FIG. 1B, in accordance with some embodiments. As shown in FIG. 1A, the backplane connector 114 may be configured to be attached to a backplane 110, and the daughter card connector 116 may be configured to be attached to a daughter card 112. When the backplane connector 114 and the daughter card connector 116 mate with each other, conductors in these two connectors become electrically connected, thereby completing conductive paths between corresponding conductive elements in the backplane 110 and the daughter card 112.

Although not shown, the backplane 110 may, in some embodiments, have many other backplane connectors attached to it so that multiple daughter cards can be connected to the backplane 110. Additionally, multiple backplane connectors may be aligned end to end so that they may be used to connect to one daughter card. However, for clarity, only a portion of the backplane 110 and a single daughter card 112 are shown in FIG. 1B.

In the example of FIG. 1B, the backplane connector 114 may include a shroud 120, which may serve as a base for the backplane connector 114 and a housing for conductors within the backplane connector. In various embodiments, the shroud 120 may be molded from a dielectric material such as plastic or nylon. Examples of suitable materials include, but are not limited to, liquid crystal polymer (LCP), polyphenyline sulfide (PPS), high temperature nylon or polypropylene (PP), or polyphenylenoxide (PPO). Other suitable materials may be employed, as aspects of the present disclosure are not limited in this regard.

All of the above-described materials are suitable for use as binder material in manufacturing connectors. In accordance some embodiments, one or more fillers may be included in some or all of the binder material used to form the backplane shroud 120 to control the electrical and/or mechanical properties of the backplane shroud 120. As a non-limiting example, thermoplastic PPS filled to 30% by volume with glass fiber may be used.

In some embodiments, the floor of the shroud 120 may have columns of openings 126, and conductors 122 may be inserted into the openings 126 with tails 124 extending through the lower surface of the shroud 120. The tails 124 may be adapted to be attached to the backplane 110. For example, in some embodiments, the tails 124 may be adapted to be inserted into respective signal holes 136 on the backplane 110. The signal holes 136 may be plated with some suitable conductive material and may serve to electrically connect the conductors 122 to signal traces (not shown) in the backplane 110.

In some embodiments, the tails 124 may be press fit "eye of the needle" compliant sections that fit within the signal holes 136. However, other configurations may also be used, such as surface mount elements, spring contacts, solderable pins, etc., as aspects of the present disclosure are not limited to the use of any particular mechanism for attaching the backplane connector 114 to the backplane 110.

For clarity of illustration, only one of the conductors 122 is shown in FIG. 1B. However, in various embodiments, the backplane connector may include any suitable number of parallel columns of conductors and each column may include any suitable number of conductors. For example, in one embodiment, there are eight conductors in each column.

The spacing between adjacent columns of conductors is not critical. 1B. However, a higher density may be achieved by placing the conductors closes together. As a non-limiting example, the conductors 122 may be stamped from 0.4 mm thick copper alloy, and the conductors within each column may be spaced apart by 2.25 mm and the columns of conductors may be spaced apart by 2 mm. However, in other embodiments, smaller dimensions may be used to provide higher density, such as a thickness between 0.2 and 0.4 mils or spacing of 0.7 to 1.85 mm between columns or between conductors within a column.

In the example shown in FIG. 1B, a groove 132 is formed in the floor of the shroud 120. The groove 132 runs parallel to the column of openings 126. The shroud 120 also has grooves 134 formed in its inner sidewalls. In some embodiments, a shield plate 128 is adapted fit into the grooves 132 and 134. The shield plate 128 may have tails 130 adapted to extend through openings (not shown) in the bottom of the groove 132 and to engage ground holes 138 in the backplane 110. Like the signal holes 136, the ground holes 138 may be plated with any suitable conductive material, but the ground holes 138 may connect to ground traces (not shown) on the backplane 110, as opposed to signal traces.

In the example shown in FIG. 1B, the shield plate 128 has several torsional beam contacts 142 formed therein. In some embodiments, each contact may be formed by stamping arms 144 and 146 in the shield plate 128. Arms 144 and 146 may then be bent out of the plane of the shield plate 128, and may be long enough that they may flex when pressed back into the plane of the shield plate 128. Additionally, the arms 144 and 146 may be sufficiently resilient to provide a spring force when pressed back into the plane of the shield plate 128. The spring force generated by each arm 144 or 146 may create a point of contact between the arm and a shield plate 150 of the daughter card connector 116 when the backplane connector 114 is mated with the daughter card connector 116. The generated spring force may be sufficient to ensure this contact even after the daughter card connector 116 has been repeatedly mated and unmated from the backplane connector 114.

In some embodiments, the arms 144 and 146 may be coined during manufacture. Coining may reduce the thickness of the material and increase the compliancy of the beams without weakening the shield plate 128. For enhanced electrical performance, it may also be desirable that the arms 144 and 146 be short and straight. Therefore, in some embodiments, the arms 114 and 146 are made only as long as needed to provide sufficient spring force.

In some embodiments, alignment or gathering features may be included on either the backplane connector or the mating connector. Complementary features that engage with the alignment or gathering features on one connector may be included on the other connector. In the example shown in FIG. 1B, grooves 140 are formed on the inner sidewalls of the shroud 120. These grooves may be used to align the daughter card connector 116 with the backplane connector 114 during mating. For example, in some embodiments, tabs 152 of the daughter card connector 116 may be adapted to fit into corresponding grooves 140 for alignment and/or to prevent side-to-side motion of the daughter card connector 116 relative to the backplane connector 114.

In some embodiments, the daughter card connector 116 may include one or more wafers. In the example of FIG. 1B, only one wafer 154 is shown for clarity, but the daughter card connector 116 may have several wafers stacked side to side. In some embodiments, the wafer 154 may include a column of one or more receptacles 158, where each receptacle 158 may be adapted to engage a respective one of the conductors 122 of the backplane connector 114 when the backplane connector 114 and the daughter card connector 116 are mated. Thus, in such an embodiment, the daughter card connector 116 may have as many wafers as there are columns of conductors in the backplane connector 114.

In some embodiments, the wafers may be held in or attached to a support member. In the example shown in FIG. 1B, wafers of the daughter card connector 116 are supported in a stiffener 156. In some embodiments, the stiffener 156 may be stamped and formed from a metal strip. However, it should be appreciated that other materials and/or manufacturing techniques may also be suitable, as aspects of the present disclosure are not limited to the use of any particular type of stiffeners, or any stiffener at all. Furthermore, other structures, including a housing portion to which individual wafers may be attached may alternatively or additionally be used to support the wafers. In some embodiments, if the housing portion is insulative, it may have cavities that receive mating contact portions of the wafers to electrically isolate the mating contact portions. Alternatively or additionally, a housing portion may incorporate materials that impact electrical properties of the connector. For example, the housing may include shielding and/or electrically lossy material.

In embodiments with a stiffener, the stiffener 156 may be stamped with features (e.g., one or more attachment points) to hold the wafer 154 in a desired position. As a non-limiting example, the stiffener 156 may have a slot 160A formed along its front edge. The slot 160A may be adapted to engage a tab 160B of the wafer 154. The stiffener 156 may further include holes 162A and 164A, which may be adapted to engage, respectively, hubs 162B and 164B of the wafer 154. In some embodiments, the hubs 162B and 164B are sized to provide an interference fit in the holes 162A and 164A, respectively. However, it should be appreciated that other attachment mechanisms may also be suitable, such as adhesives.

While a specific combination and arrangement of slots and holes on the stiffener 156 are shown in FIG. 1B, it should be appreciated that aspects of the present disclosure are not limited to any particular way of attaching wafers to the stiffener 156. For example, the stiffener 156 may have a set of slots and/or holes for each wafer supported by the stiffener 156, so that a pattern of slots and/or holes is repeated along the length of stiffener 156 at each point where a wafer is to be attached. Alternatively, the stiffener 156 may have different combinations of slots and/or holes, or may have different attachment mechanisms for different wafers.

In the example shown in FIG. 1B, the wafer 154 includes two pieces, a shield piece 166 and a signal piece 168. In some embodiments, the shield piece 166 may be formed by insert molding a housing 170 around a front portion of the shield plate 150, and the signal piece 168 may be formed by insert molding a housing 172 around one or more conductive elements. Examples of such conductive elements are described in greater detail below in connection with FIG. 3.

Figure 2A:
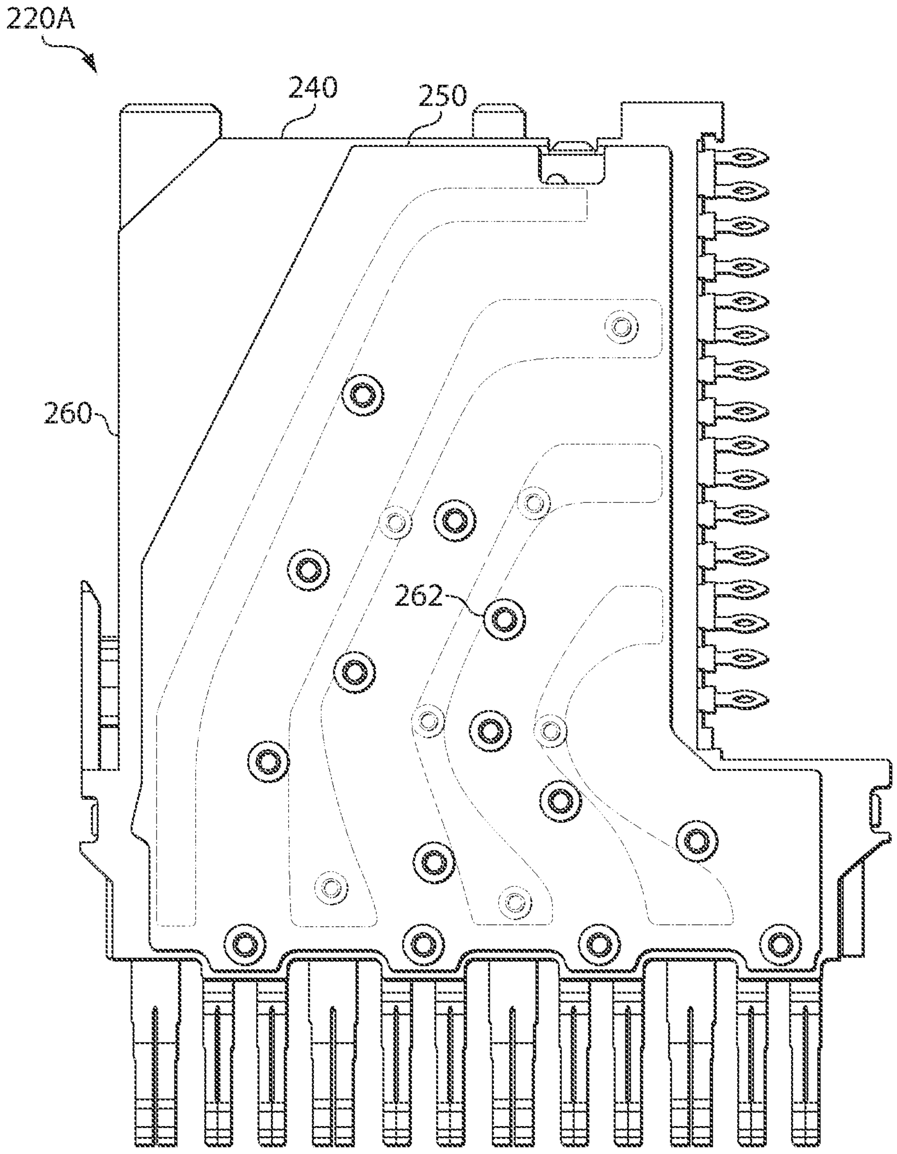
FIGS. 2A-B show opposing side views of an illustrative wafer, in accordance with some embodiments.
Figure 2B:
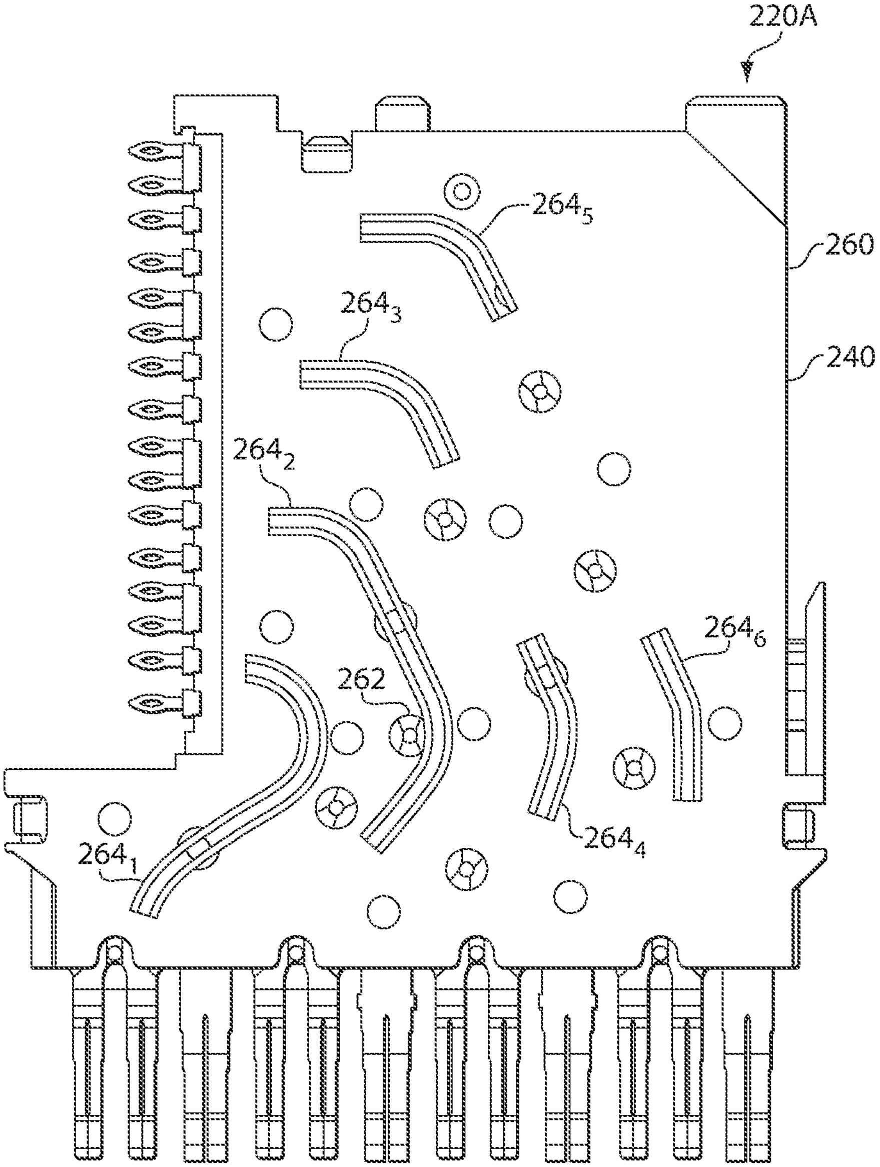

FIGS. 2A-B show opposing side views of an illustrative wafer 220A, in accordance with some embodiments. The wafer 220A may be formed in whole or in part by injection molding of material to form a housing 260 around a wafer strip assembly. In the example shown in FIGS. 2A-B, the wafer 220A is formed with a two shot molding operation, allowing the housing 260 to be formed of two types of materials having different properties. The insulative portion 240 is formed in a first shot and a lossy portion 250 is formed in a second shot. However, any suitable number and types of materials may be used in the housing 260. For example, in some embodiments, the housing 260 is formed around a column of conductive elements by injection molding plastic.

In some embodiments, the housing 260 may be provided with openings, such as windows or slots $\mathbf{264}_1 \ldots \mathbf{264}_6$, and holes, of which hole 262 is numbered, adjacent signal conductors enclosed in the housing 260. These openings may serve multiple purposes, including: (i) to ensure during an injection molding process that the conductive elements are properly positioned, and/or (ii) to facilitate insertion of materials that have different electrical properties, if so desired.

The time it takes an electrical signal to propagate from one end of a signal conductor to the other end is known as the "propagation delay." In some embodiments, it may be desirable that the signals within a pair have the same propagation delay, which is commonly referred to as having "zero skew" within the pair.

Wafers with various configurations may be formed in any suitable way, as aspects of the present disclosure are not limited to any particular manufacturing method. In some embodiments, insert molding may be used to form a wafer or a wafer module. Such components may be formed by an insert molding operation in which a housing material is molded around conductive elements. The housing may be wholly insulative or may include electrically lossy material, which may be positioned depending on the intended use of the conductive elements in the wafer or module being formed.

Figure 3:
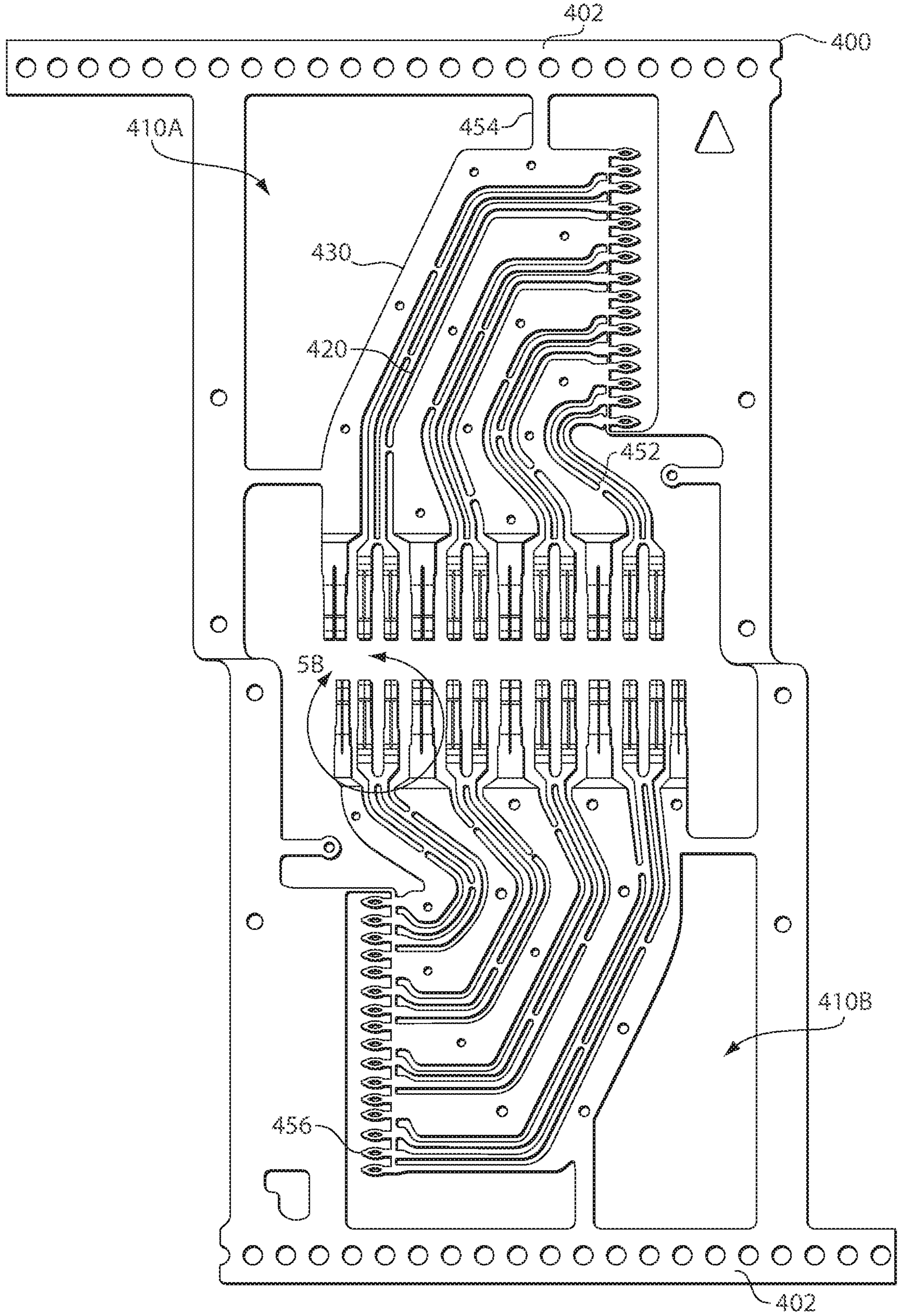
FIG. 3 is a plan view of an illustrative lead frame used in the manufacture of a connector, in accordance with some embodiments.

FIG. 3 shows illustrative wafer strip assemblies 410A and 410B suitable for use in making a wafer, in accordance with some embodiments. For example, the wafer strip assemblies 410A-B may be used in making the wafer 154 in the example of FIG. 1B by insert molding a housing around intermediate portions of the conductive elements of wafer strip assemblies. However, it should be appreciated that conductive elements as disclosed herein may be incorporated into electrical connectors whether or not manufactured using insert molding.

In the example of FIG. 3, the wafer strip assemblies 410A-B each includes conductive elements in a configuration suitable for use as one column of conductors in a daughter card connector (e.g., the daughter card connector 116 in the example of FIG. 1B). A housing may then be molded around the conductive elements in each wafer strip assembly in an insert molding operation to form a wafer.

To facilitate the manufacture of wafers, signal conductors (e.g., signal conductor 420) and ground conductors (e.g., ground conductor 430) may be held together on a lead frame, such as the illustrative lead frame 400 in the example of FIG. 3. For example, the signal conductors and the ground conductors may be attached to one or more carrier strips, such as the illustrative carrier stripes 402 shown in FIG. 3.

In some embodiments, conductive elements (e.g., in single-ended or differential configuration) may be stamped for many wafers from a single sheet of conductive material. The sheet may be made of metal or any other material that is conductive and provides suitable mechanical properties for conductive elements in an electrical connector. Phosphor-bronze, beryllium copper and other copper alloys are non-limiting example of materials that may be used.

FIG. 3 illustrates a portion of a sheet of conductive material in which the wafer strip assemblies 410A-B have been stamped. Conductive elements in the wafer strip assemblies 410A-B may be held in a desired position by one or more retaining features (e.g., tie bars 452, 454 and 456 in the example of FIG. 3) to facilitate easy handling during the manufacture of wafers. Once material is molded around the conductive elements to form housings, the retaining features may be disengaged. For example, the tie bars 452, 454 and 456 may be severed, thereby providing electronically separate conductive elements and/or separating the wafer strip assemblies 410A-B from the carrier strips 402. The resulting individual wafers may then be assembled into daughter board connectors.

In the example of FIG. 3, ground conductors (e.g., the ground conductor 430) are wider compared to signal conductors (e.g., the signal conductor 420). Such a configuration may be suitable for carrying differential signals, where it may be desirable to have the two signal conductors within a differential pair disposed close to each other to facilitate preferential coupling. However, it should be appreciated that aspects of the present disclosure are not limited to the use of differential signals. Various concepts disclosed herein may alternatively be used in connectors adapted to carry single-ended signals.

Although the illustrative lead frame 400 in the example of FIG. 3 has both ground conductors and signal conductors, such a construction is not required. In alternative embodiments, ground and signal conductors may be formed in two separate lead frames, respectively. In yet some embodiments, no lead frame may be used, and individual conductive elements may instead be employed during manufacture. Additionally, in some embodiments, no insulative material may be molded over a lead frame or individual conductive elements, as a wafer may be assembled by inserting the conductive elements into one or more preformed housing portions. If there are multiple housing portions, they may be secured together with any suitable one or more attachment features, such as snap fit features.

The wafer strip assemblies shown in FIG. 3 provide just one illustrative example of a component that may be used in the manufacture of wafers. Other types and/or configurations of components may also be suitable. For example, a sheet of conductive material may be stamped to include one or more additional carrier strips and/or bridging members between conductive elements for positioning and/or support of the conductive elements during manufacture. Accordingly, the details shown in FIG. 3 are merely illustrative and are non-limiting. It should be appreciated that some or all of the concepts discussed above in connection with daughter card connectors for providing desirable characteristics may also be employed in the backplane connectors. For example, in some embodiments, signal conductors in a backplane connector (e.g., the backplane connector 114 in the example of FIG. 1B) may be arranged in columns, each containing differential pairs interspersed with ground conductors. In some embodiments, the ground conductors may partially or completely surround each pair of signal conductors. Such a configuration of signal conductors and ground shielding may provide desirable electrical characteristics, which can facilitate operation of the connectors at higher frequencies, such between about 25 GHz and 40 GHz, or higher.

The inventors have recognized and appreciated, however, that using conventional connector manufacturing techniques to incorporate sufficient grounding structures into a connector to largely surround some or all of the signal pairs within the connector may increase the size of the connector such that there is an undesirable decrease in the number of signals that can be carried per inch of the connector. Moreover, the inventors have recognized and appreciated that using conventional connector manufacturing techniques to provide ground structures around signal pairs introduces substantial complexity and expense in the manufacture of connector families as may be sold commercially. Such families include a range of connector sizes, such as 2-pair, 3-pair, 4-pair, 5-pair, or 6-pair, to satisfy a range of system configurations. Here, the number of pairs refers to the number of pairs in one column of conductive elements, which means that the number of rows of conductive elements is different for each connector size. Tooling to manufacture all of the desired sizes can multiply the cost of providing a connector family.

Further, the inventors have recognized and appreciated that conventional approaches for reducing "skew" in signal pairs are less effective at higher frequencies, such between about 25 GHz and 40 GHz, or higher. Skew, in this context, refers to the difference in electrical propagation time between signals of a pair that operates as a differential signal. Such differences can arise from differences in physical length of the conductive elements that form the pair. Such differences can arise, for example, in a right angle connector in which conductive elements forming a pair are next to each other within the same column. One conductive element will have a larger radius of curvature than the other as the signal conductors bend through a right angle. Conventional approaches have entailed selective positioning of material of lower dielectric constant around the longer conductive element, which causes a signal to propagate faster through the longer conductive element, which compensates for the longer distance a signal travels through that conductive element.

In some embodiments, connectors may be formed of modules, each carrying a signal pair. The modules may be individually shielded, such as by attaching shield members to the modules and/or inserting the modules into an organizer or other structure that may provide electrical shielding between pairs and/or ground structures around the conductive elements carrying signals.

The modules may be assembled into wafers or other connector structures. In some embodiments, different modules may be formed for each row position at which a pair is to be assembled into a right angle connector. These modules may be made to be used together to build up a connector with as many rows as desired. For example, a module of one shape may be formed for a pair to be positioned at the shortest row of the connector, sometimes called the a-b rows. A separate module may be formed for conductive elements in the next longest rows, sometimes called the c-d rows. The inner portion of the module with the c-d rows may be designed to conform to the outer portion of the module with a-b rows.

This pattern may be repeated for any number of pairs. Each module may be shaped to be used with modules that carry pairs for shorter and/or longer rows. To make a connector of any suitable size, a connector manufacturer may assemble into a wafer a number of modules to provide a desired number of pairs in the wafer. In this way, a connector manufacturer may introduce a connector family for a widely used connector size—such as 2 pairs. As customer requirements change, the connector manufacturer may procure tools for each additional pair, or, for modules that contain multiple pairs, group of pairs to produce connectors of larger sizes. The tooling used to produce modules for smaller connectors can be used to produce modules for the shorter rows even of the larger connectors.

Figure 4A:
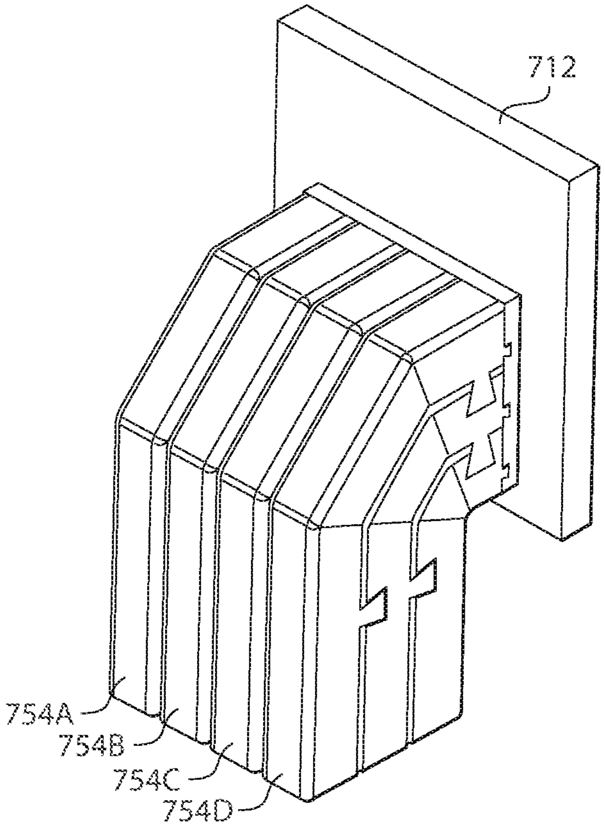
FIGS. 4A-B shows a plurality of illustrative modular wafers stacked side to side, in accordance with some embodiments.
Figure 4B:
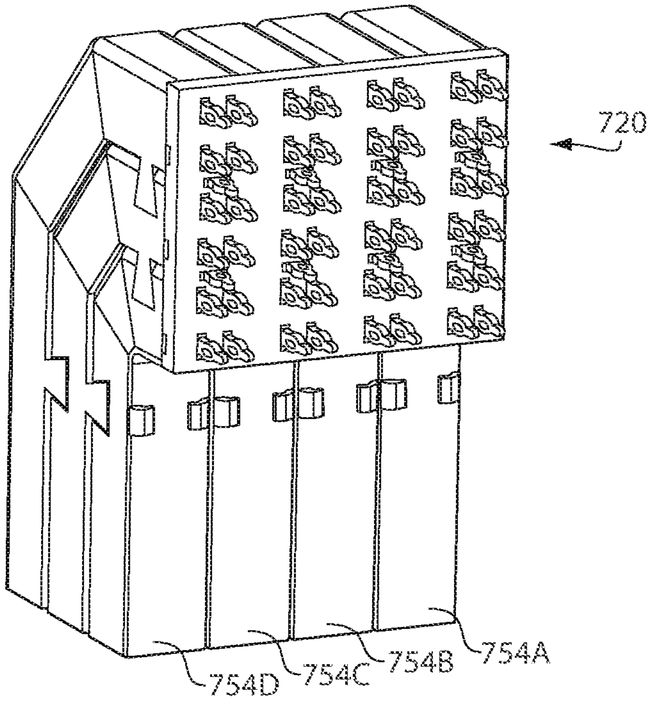

Such a modular connector is illustrated in FIGS. 4A-B. FIGS. 4A-B shows a plurality of illustrative wafers 754A-D stacked side to side, in accordance with some embodiments. In this example, the illustrative wafers 754A-D have a right angle configuration and may be suitable for use in a right angle electrical connector (e.g., the daughter-card connector 116 of the example of FIG. 1B). However, it should be appreciated that the concepts disclosed herein may also be used with other types of connectors, such as backplane connectors, cable connectors, stacking connectors, mezzanine connectors, I/O connectors, chip sockets, etc.

In the example of FIGS. 4A-B, the wafers 754A-D are adapted for attachment to a printed circuit board, such as daughter card 712, which may allow conductive elements in the wafers 754A-D to form electrical connections with respective traces in the daughter card 712. Any suitable mechanism may be used to connect the conductive elements in the wafers 754A-D to traces in the daughter card 712. For example, as shown in FIG. 4B, conductive elements in the wafers 754A-D may include a plurality of contact tails 720 adapted to be inserted into via holes (not shown) formed in the daughter card 712. In some embodiments, the contact tails 720 may be press fit "eye of the needle" compliant sections that fit within the via holes of the daughter card 712. However, other configurations may also be used, such as compliant members of other shapes, surface mount elements, spring contacts, solderable pins, etc., as aspects of the present disclosure are not limited to the use of any particular mechanism for attaching the wafers 754A-D to the daughter card 712.

Figure 5A:
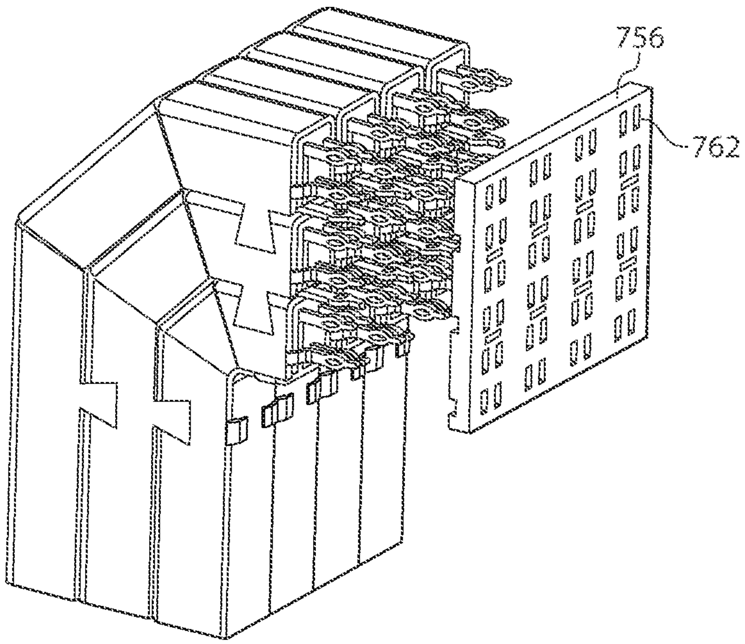
FIGS. 5A-B shows an illustrative organizer adapted to fit over contact tails of the illustrative wafers of the example of FIGS. 4A-B, in accordance with some embodiments.
Figure 5B:
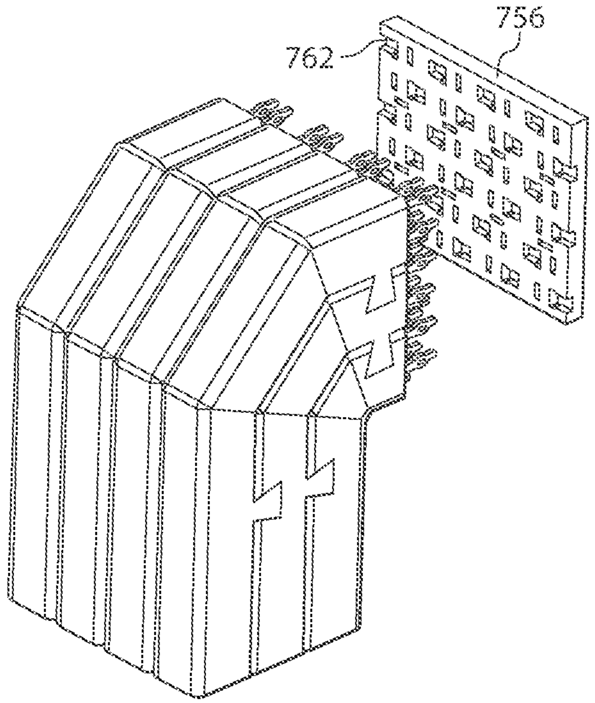

In some embodiments, the wafers 754A-D may be attached to members that hold the wafers together or that support elements of the connector. For example, an organizer configured to hold contact tails of multiple wafers may be used. FIGS. 5A-B show an illustrative organizer 756 adapted to fit over the wafers 754A-D of the example of FIGS. 4A-B, in accordance with some embodiments. In this example, the organizer 756 includes a plurality of openings, such as opening 762. These openings may be sized and arranged to receive the contact tails 720 of the illustrative wafers 754A-D. In some embodiments, the illustrative organizer 756 may be made of a rigid material, and may facilitate alignment and/or reduce relative movement among the illustrative wafers 754A-D. In addition, in some embodiments, the illustrative organizer 756 may be made of an insulative material (e.g., insulative plastic), and may support the contact tails 720 as a connector is being mounted to a printed circuit board or keep the contact tails 720 from being shorted together.

Further, in some embodiments, the organizer 756 may have a dielectric constant that matches the dielectric constant of a housing material used in the wafers. The organizer 756 may be configured to occupy space between the wafer housings and the surface of a printed circuit board to which the connector is mounted. To provide such a function, for example, the organizer 756 may have a flat surface, as visible in FIG. 4B, for mounting against a printed circuit board. An opposing surface, facing the wafers, may have projections of any other suitable profile to match a profile of the wafers. In this way, the organizer 756 may contribute to a uniform impedance along signal conductors passing through the connector and into the printed circuit board.

Though not illustrated in FIG. 4A-B or 5A-B, other support members may alternatively or additionally be used to hold the wafers together. A metal stiffener or a plastic organizer, for example, may be used to hold the wafers near their mating interfaces. As yet a further possible attachment mechanism, wafers may contain features that may engage complementary features on other wafers, thereby holding the wafers together.

Each wafer may be constructed in any suitable way. In some embodiments, a wafer may be constructed of a plurality of modules each of which carries one or more conductive elements shaped to carry signals. In exemplary embodiments described herein, each module carries a pair of signal conductors. These signal conductors may be aligned in the column direction, as in a wafer assembly shown in FIG. 2A or 2B. Alternatively, these signal conductors may be aligned in the row direction, such that each module carries signal conductors in at least two adjacent rows, As yet a further alternative, the signal conductors of a pair may be offset relative to each other in both the row direction and the column direction such that each module contains signal conductors in two adjacent rows and two adjacent columns.

In yet other embodiments, the signal conductors may be aligned in the column direction over some portion of their length and in the row direction over other portions of their length. For example, the signal conductors may be aligned in the row direction over their intermediate portions within the wafer housing. Such a configuration achieves broadside coupling, which results in signal conductors, even in a right angle connector, of substantially equal length and avoids skew, The signal conductors may be aligned in the column direction at their contact tails and/or mating interfaces. Such a configuration achieves edge coupling at the contact tails and/or mating interface. Such a configuration may aid in routing traces within a printed circuit board to the vias into which the contact tails are inserted. Different alignment over different portions of the conductive elements may be achieved using transition regions in which portions of the conductive elements bend or curve to change their relative position.

Figure 6A:
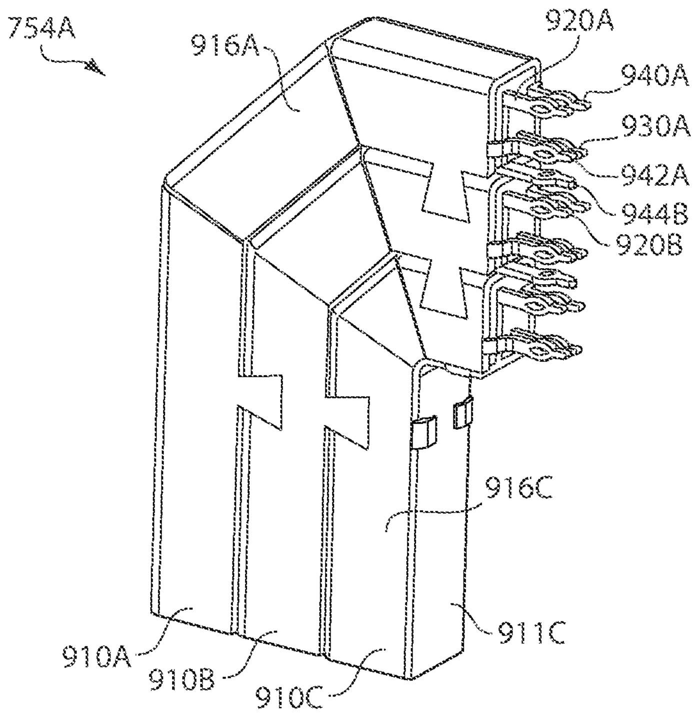
FIGS. 6A-B are, respectively, perspective and exploded views of an illustrative modular wafer, in accordance with some embodiments.
Figure 6B:
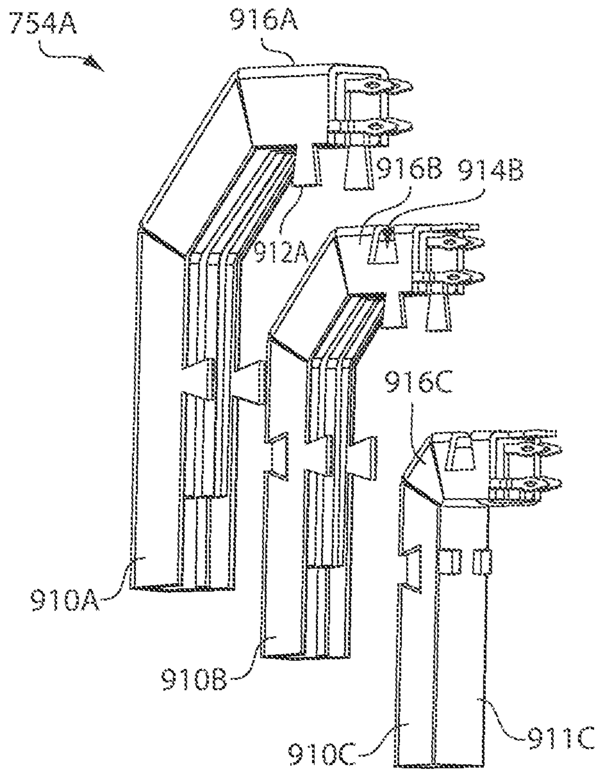

FIGS. 6A-B are, respectively, perspective exploded views of the illustrative wafer 754A, in accordance with some embodiments. As shown in these views, the illustrative wafer 754A has a modular construction. In this example, the illustrative wafer 754A includes three modules 910A-C that are sized and shaped to fit together in a right angle configuration. For example, the module 910A may be positioned on the outside of the right angle turn, forming the longest rows of the wafer. The module 910B may be positioned in the middle, and the module 910C may be positioned on the inside, forming the shortest rows. Accordingly, the module 910A may be longer than the module 910B, which in turn may be longer than the module 910C.

The inventors have recognized and appreciated that a modular construction such as that shown in FIGS. 6A-B may advantageously reduce tooling costs. For example, in some embodiments, a separate set of tools may be configured to make a corresponding one of the modules 910A-C. If a new wafer design calls for four modules (e.g., by adding a module on the outside of the modules 910A-C), all three sets of existing tools may be reused, so that only one set of new tools is needed to make the fourth module. This may be less costly than a new set of tools for making the entire wafer.

The modules 910A-C may be held together in any suitable manner (e.g., by mere friction) to form a wafer. In some embodiments, an attachment mechanism may be used to hold two or more of the modules 910A-C together. For instance, in the example of FIGS. 6A-B, the module 910A includes a protruding portion 912A adapted to be inserted into a recess 914B formed in the module 910B. The protruding portion 912A and the corresponding recess 914B may both have a dovetail shape, so that when they are assembled together they may reduce rotational movement between the modules 910A-B. However, other suitable attachment mechanisms may alternatively or additionally be used. The attachment mechanisms may include snaps or latches. As yet another example, the attachment mechanisms may include hubs extending from one module that engage, via an interference fit or other suitable engagement, a hole or other complementary structure on another module. Examples of other suitable structures may include adhesives or welding.

Any number of such attachment mechanisms may be used to hold the modules 910A-B together. For example, two attachment mechanisms may be used on each side of the modules 910A-B, with one of the attachment mechanisms being oriented orthogonally to the other attachment mechanism, which may further reduce rotational movement between the modules 910A-B. However, it should be appreciated that aspects of the present disclosure are not limited to the use of dovetail shaped attachment mechanisms, nor to any particular number or arrangement of attachment mechanisms between any two modules.

In various embodiments, the modules 910A-C of the illustrative wafer 754A may include any suitable number of conductive elements, which may be configured to carry differential and/or single-ended signals, and/or as ground conductors. For instance, in some embodiments, the module 910A may include a pair of conductive elements configured to carry a differential signal. These conductive elements may have, respectively, contact tails 920A and 930A.

In some embodiments, the modules 910A-C of the illustrative wafer 754A may include ground conductors. For example, an outer casing of the module 910A may be made of conductive material and serve as a shield member 916A. The shield member 916A may be formed from a sheet of metal that is shaped to conform to the module. Such a casing may be made by stamping and forming techniques as are known in the art. Alternatively, the shield member 916A may be formed of a conductive, or partially conductive, material that is plated on or overmolded on the outer portion of the module housing. The shield member 916A, for example, may be a moldable matrix material into which are mixed conductive fillers, to form a conductive or lossy conductive material. In such an embodiment, the shield member 916A and attachment mechanism for the modules may be the same, formed by overmolding material around the modules.

In some embodiments, the shield member 916A may have a U-shaped cross section, so that the conductive elements in the module 910A may be surrounded on three sides by the shield member 916A for that module. In some embodiments, the module 910B may also have a U-shaped shield member 916B, so that when the modules 910A-B are assembled together, the conductive elements in the module 910A may be surrounded on three sides by the shield member 916A and on the remaining side by the shield member 916B. This may provide a fully shielded signal path, which may improve signal quality, for example, by reducing crosstalk.

In some embodiments, an innermost module may include an additional shield member to provide a fully shielded signal path. For instance, in the example of FIGS. 6A-B, the module 910C includes a U-shaped shield member 916C and an additional shield member 911C which together surround the conductive elements in the module 910C on all four sides. However, it should be appreciated that aspects of the present disclosure are not limited to the use of shield members to completely enclose a signal path, as a desirable amount of shielding may be achieved by selectively placing shield members around the signal path without completing enclosing the signal path.

In some embodiments, the shield member 916A may be stamped from a single sheet of material (e.g., some suitable metal alloy), and similarly for the shield member 916B. One or more suitable attachment mechanisms may be formed during the stamping process. For example, the protrusion 912A and the recess 914B discussed above may be formed on the shield members 916A and 916B, respectively, by stamping. However, it should be appreciated that aspects of the present disclosure are not limited to forming a shield member by stamping from a single sheet of material. In some embodiments, a shield member may be formed by assembling together multiple component pieces (e.g., by welding or otherwise attaching the pieces together).

In some embodiments, one or more contact tails of the illustrative wafer 754A may be contact tails of ground conductors. For example, contact tails 940A and 942A of the module 910A may be electrically coupled to the shield member 916A, and contact tail 944B of the module 910B may be electrically coupled to the shield member 916B. In some embodiments, these contact tails may be integrally connected to the respective shield members (e.g., stamped out of the same sheet of material), but that is not required, as in other embodiments the contact tails may be formed as separate pieces and connected to the respective shield members in any suitable manner (e.g., by welding). Also, aspects of the represent disclosure are not limited to having contact tails electrically coupled to shield members. In some embodiments, any of the contact tails 940A, 942A, and 944B may be connected to a ground conductor that is not configured as a shield member.

In some embodiments, contact tails of ground conductors may be arranged so as to separate contact tails of adjacent signal conductors. In the example of FIGS. 6A-B, the ground contact tail 942A may be positioned next to the signal contact tail 930A so that when the illustrative wafer 954A is stacked next to a like wafer (e.g., the wafer 954B in the example of FIGS. 4A-B), the ground contact tail 942A is between the signal contact tail 930A and the corresponding signal contact tail in the like wafer. As another example, the ground contact tail 944A may be positioned between the signal contact tail 930A and a contact tail 920B of the module 910B, which may also be a signal contact tail. In this manner, when multiple wafers are stacked side to side, each pair of signal contact tails may be separated from every adjacent pair of signal contact tails. This configuration may improve signal quality, for example, by reducing crosstalk between adjacent differential pairs. However, it should be appreciated that aspects of the present disclosure are not limited to the use of ground contact tails to separate adjacent signal contact tails, as other arrangements may also be suitable.

In the example of FIG. 6B, at least some of the modules contain three ground contact tails coupled to a shield member. Such a configuration positions contact tails symmetrically with respect to each pair. Symmetric positioning of ground contact tails also positions ground contact vias symmetrically with respect to signal visas within a printed circuit board to which a connector is attached. In this example, each module contains two ground contact tails that are bent into position adjacent the signal contact tails and that provide shielding wafer to wafer. At least some of the modules include an additional ground contact tail that, when modules are positioned in a wafer separate pairs from module to module. The longest and shortest modules do not have a ground contact tail on the outer side and inner side, respectively, of their signal pairs. In some embodiments, though, such additional ground contact tails may be included. Moreover, other configurations of ground contact tails may be used to symmetrically position ground contact tails around the signal conductors and those configurations may have more or fewer ground contact tails than three per module.

Figure 7A:
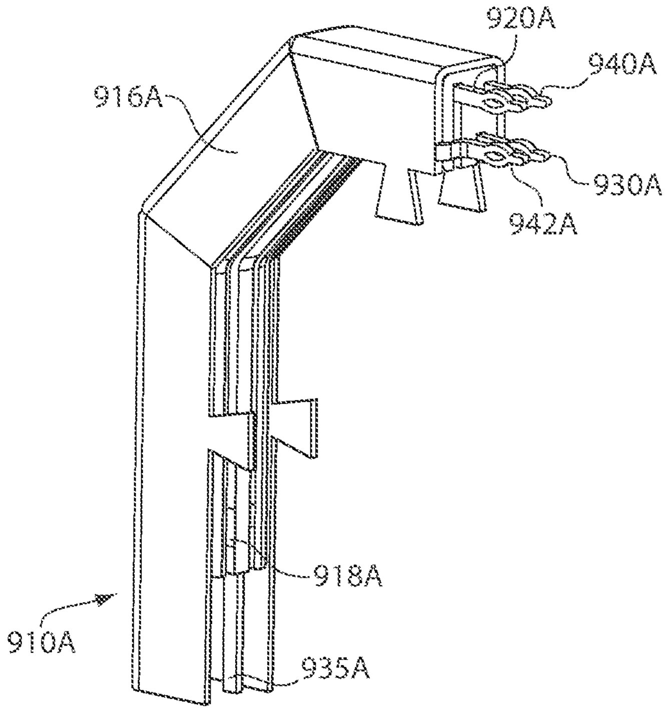
FIGS. 7A and 7C are perspective views of an illustrative module of a wafer, in accordance with some embodiments.
Figure 7B:
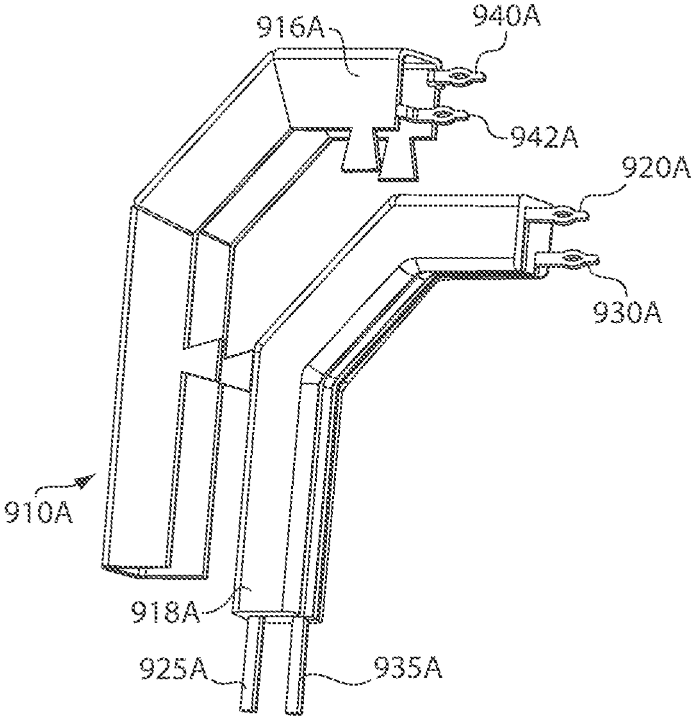
FIG. 7B is an exploded view of the illustrative module of the example of FIG. 7A, in accordance with some embodiments.
Figure 7C:
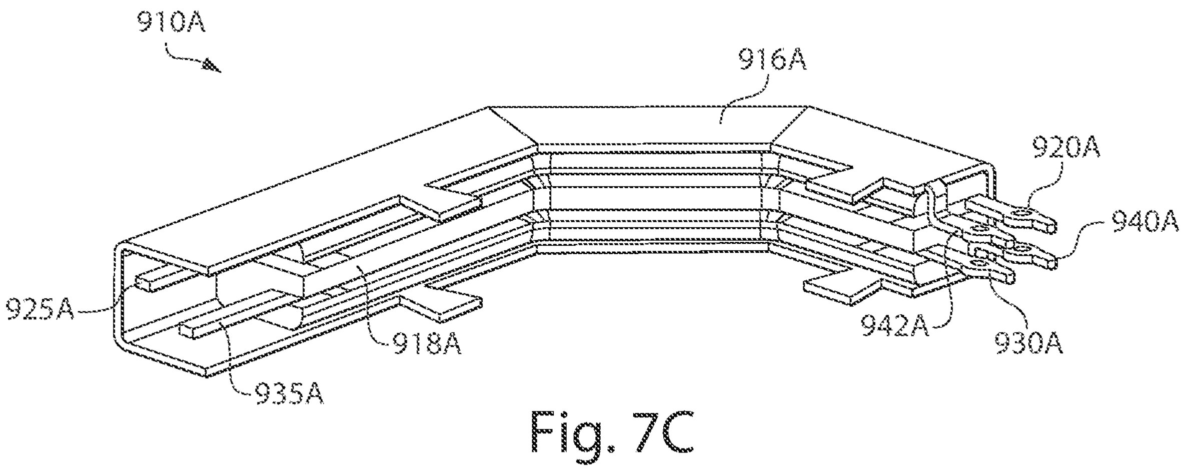

FIGS. 7A and 7C are perspective views of the illustrative module 910A, in accordance with some embodiments. FIG. 7B is a partially exploded view of the illustrative module 910A, in accordance with some embodiments. As shown in these views, the illustrative module 910A includes two conductive elements 925A and 935A inserted into a housing 918A. The conductive elements may be secured in the housing 918A in any suitable way. In the embodiment illustrated, they are inserted into slots molded in the housing 918A. They may be held in place using any suitable retention mechanism, such as an interference fit, retention features that act as latches, adhesives, or molding or inserting material in the slots after the conductive elements are inserted to lock the conductive elements in place. However, in other embodiments, the housing may be molded around the conductive elements. The housing 918A may be sized and shaped to fit into the shield member 916A.

In the embodiment illustrated in FIGS. 7A and 7C, the conductive elements 925A and 935A have generally the same size and shape. Each has a contact tail, exposed in one surface of the housing. In this example, the contact tails are illustrated as press-fit eye-of-the-needle contacts, but any suitable contact tail may be used. Each conductive element also has a mating contact portion exposed in another surface of the housing. In this example, the mating contact portion is illustrated as a flat portion of the conductive element. However, the mating contact portion may have other shapes, which may be created by attaching a further member or by forming the end of the conductive element into a desired shape. In this example, the conductive elements 925A and 935A are shown with the same thickness and width. In this example, though, the conductive element 935A is shorter than the conductive element 925A. In such an embodiment, to reduce skew within a pair, the conductive elements may be shaped differently to provide a faster propagation speed in the longer conductor.

Figure 8A:
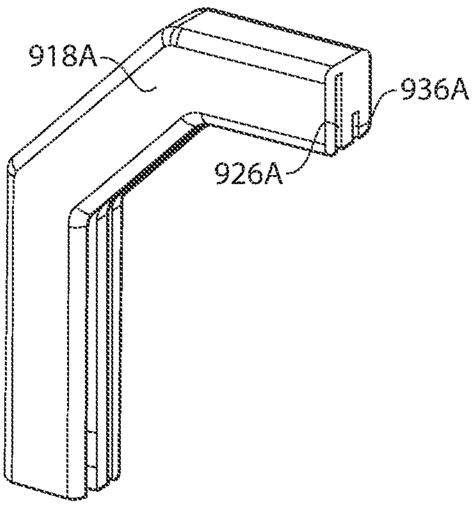
FIGS. 8A and 8C are perspective views of an illustrative housing of the module of the example of FIG. 7A, in accordance with some embodiments.
Figure 8B:
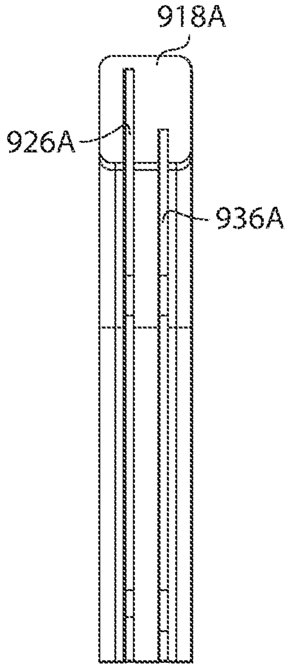
FIG. 8B is a front view of the illustrative housing of the example of FIG. 8A, in accordance with some embodiments.
Figure 8C:
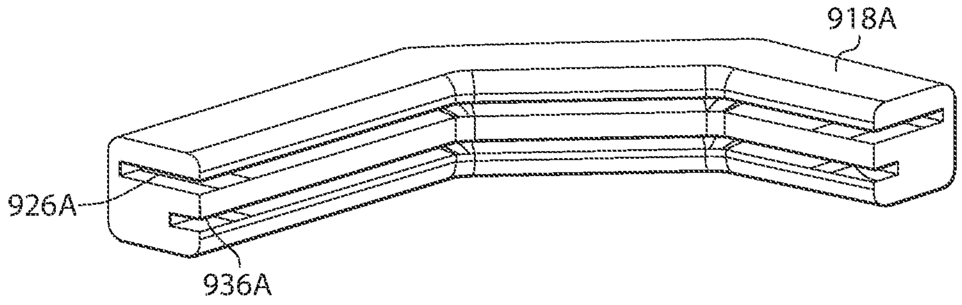

FIGS. 8A and 8C are perspective views of the illustrative housing 918A, in accordance with some embodiments. FIG. 8B is a front view of the illustrative housing 918A, in accordance with some embodiments. The housing 918A may be formed in any suitable way, including by molding using conventional insulative materials and/or lossy conductive materials. As shown in these views, the illustrative housing 918A includes two elongated slots 926A and 936A. These slots may be adapted to receive a pair of conductive elements (e.g., the conductive elements 925A and 935A of the example of FIG. 7B).

However, other housing configurations may be used. For example, the housing 918A may have a hollow portion. The hollow portion may be positioned to provide air between the conductive elements 925A and 935A. Such an approach may adjust the impedance of the pair. Alternatively or additionally, a hollow portion of housing 918A may enable insertion of lossy material or other material that improves the electrical performance of the connector.

Figure 9A:
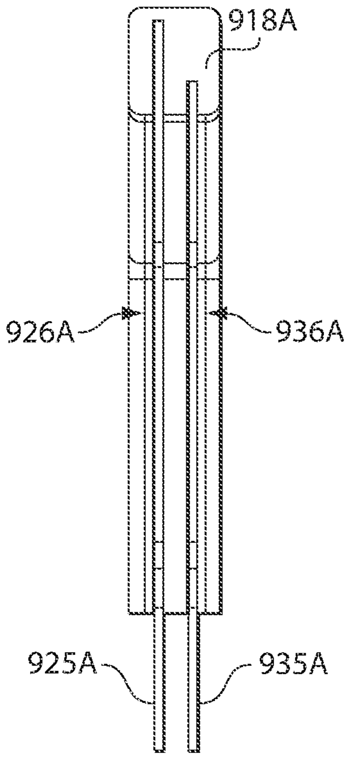
FIGS. 9A-B are, respectively, front and perspective views of the illustrative housing of the example of FIG. 8A, with conductive elements inserted into the housing, in accordance with some embodiments.
Figure 9B:
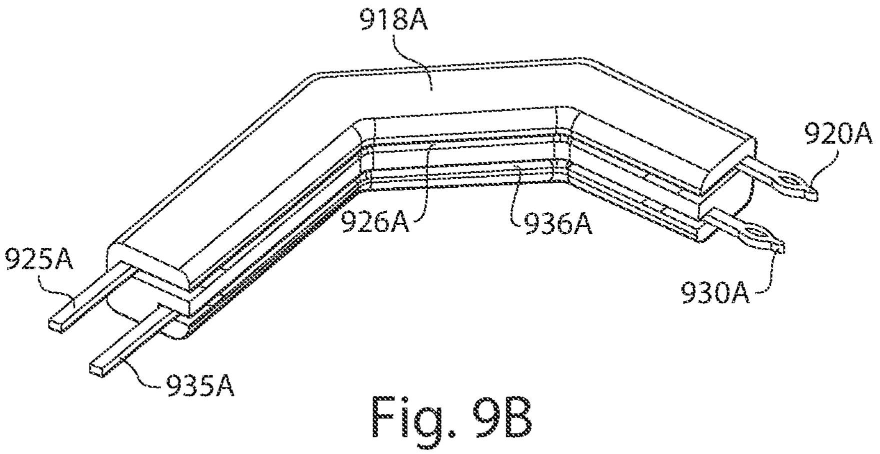
Figure 9C:
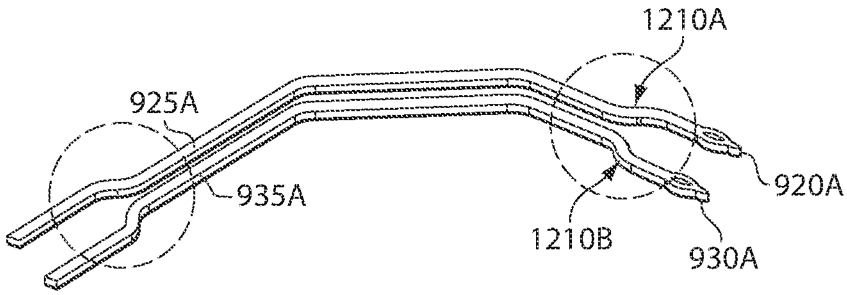
FIGS. 9C-D are, respectively, perspective and front views of illustrative conductive elements adapted to be inserted into the housing of the example of FIG. 8A, in accordance with some embodiments.
Figure 9D:
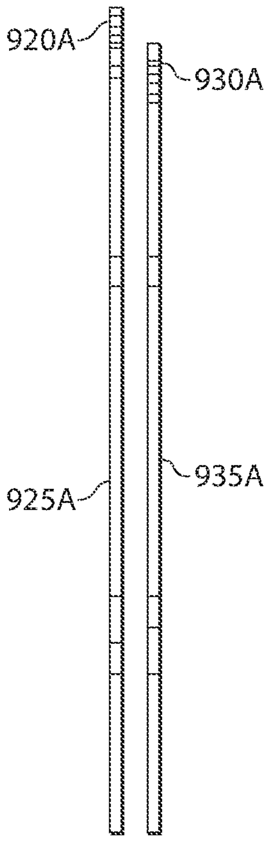

FIGS. 9A-B are, respectively, front and perspective views of the illustrative housing 918A with the conductive element 925A inserted into the slot 926A and the conductive element 955A inserted into the slot 936A, in accordance with some embodiments. FIGS. 9C-D are, respectively, perspective and front views of the illustrative conductive elements 925A and 935A, in accordance with some embodiments. In this example, the conductive elements 925A and 935A and the slots 926A and 936A are configured so that when the conductive element 925A is inserted into the slot 926A and the conductive element 925A inserted into the slot 936A, intermediate portions of the conductive elements 925A and 935A jog toward each other. As a result, the radius of curvature of the intermediate portion of the conductive element 925A gets smaller, while the radius of curvature of the intermediate portion of the conductive element 935A gets larger. Accordingly, the difference in length between the conductive elements 925A and 935A is substantially reduced relative to a configuration in which the conductive elements do not jog.

In some embodiments, the conductive elements may jog towards each other such that the edge of one conductive element is adjacent and edge of the other conductive element. In the embodiment illustrated, the conductive elements have their wide surfaces in different, but parallel planes. Each conductive element may jog toward the other within that plane parallel to its wide dimension. Accordingly, even when the edges of the conductive elements are adjacent, they will not touch because they are in different planes.

In other embodiments, the conductive elements may jog toward each other to the point that one conductive element overlaps the other in a direction that is perpendicular to the wide surface of the conductive elements. In this configuration, intermediate portions of the conductive elements 925A and 935A are broadside-coupled.

The inventors have recognized and appreciated that a broadside-coupled configuration may provide low skew in a right angle connector. When the connector operates at a relatively low frequency, the skew in a pair of edge-coupled right angle conductive elements may be a relatively small portion of the wavelength and therefore may not significantly impact the differential signal. However, when the connector operates at a higher frequency (e.g., 25 GHz, 30 GHz, 35 GHz, 40 GHz, 45 GHz, etc.), such skew may become a relatively large portion of the wavelength and may negatively impact the differential signal. Therefore, in some embodiments, a broadside-coupled configuration may be adopted to reduce skew. However, a broadside-coupled configuration is not required, as various techniques may be used to compensate for skew in alternative embodiments, such as by changing the profile (e.g., to a scalloped shape) of an edge of a conductive element on the inside of a turn to increase the length of the electrical path along that edge.

The inventors have further recognized and appreciated that, while a broadside-coupled configuration may be desirable for the intermediate portions of the conductive elements, a completely or predominantly edge-coupled configuration may be desirable at a mating interface with another connector or at an attachment interface with a printed circuit board. Such a configuration, for example, may be facilitate routing within a printed circuit board of signal traces that connect to vias receiving contact tails from the connector.

Accordingly, in the example of FIGS. 9A-D, the conductive elements 925A and 935A may have transition regions at either or both ends, such as transition regions 1210A and 1210B. In a transition region, a conductive element may jog out of the plane parallel to the wide dimension of the conductive element. In some embodiments, each transition region may have a jog toward the transition region of the other conductive element. In some embodiments, the conductive elements will each jog toward the plane of the other conductive element such that the ends of the transition regions align in a same plane that is parallel to, but between the planes of the individual conductive elements. To avoid contact of the transition regions, the conductive elements may also jog away from each other in the transition regions. As a result, the conductive elements in the transition regions may be aligned edge to edge in a plane that is parallel to, but between the planes of the individual conductive elements. For example, contact tails, such as 920A and 930A, may be edge coupled. Similar transition regions alternatively or additionally may be used at the mating contact portions of the conductive elements, in some embodiments.

FIG. 9C illustrates both ends of each conductive element jogging in the same direction. Such an approach results in the ends of the conductive element 925A being in an outer row relative to the ends of the conductive element 935A. In other embodiments, the ends of the conductive elements of a pair may jog in opposite directions. For example, the contact tail 920A may jog in the direction of the shorter rows of the connector while the contact tail 930A may jog in the direction of the longer rows. Such a jog at the circuit board interface end of the connector will, in that transition region, lengthen the conductive element 925A relative to the conductive element 935A. If the conductive elements have a jog as illustrated in the transition regions near their mating contacts, the element 925A will be longer in that transition region. By forming the transition regions symmetrically with respect to each other, the relative lengthening in one transition region may be largely or fully offset by a relative shortening in the other transition region. Such a configuration of conductive elements may reduce skew within the pair of conductive elements 925A and 935A.

In the example of FIG. 9C, as the conductive elements 925A and 935A exit the housing 918A at either end, they may jog apart from each other, for example, to conform to a desired arrangement of conductive elements at a mating interface with a backplane connector, or to match a desired arrangement of via holes on a daughter card. Transition regions at the ends of the conductive elements may be used whether or not the intermediate portions of the conductive elements jog towards each other. For example, the slot 926A may be deeper than the slot 936A at either end of the housing 918A to accommodate the desired spacing between the end portions of the conductive elements 925A and 935A.

In some embodiments, the housing 918A may be made of an insulative material (e.g., plastic or nylon) by a molding process. The housing 918A may be formed as an integral piece, or may be assembled from separately manufactured pieces. Additionally, electrically lossy material may be incorporated into the housing 918A either uniformly or at one or more selected locations to provide any desirable electrical property (e.g., to reduce crosstalk).

In some embodiments, the slots 926A and 936B may be filled with additional insulative material after the conductive elements 925A and 935A have been inserted. The additional insulative material may be the same as or different from the insulative material used to form the housing 918A. Filling the slots 926A and 936B may prevent the conductive elements 925A and 935A from shifting in position and thereby maintain signal quality. However, other ways to secure the conductive elements 925A and 935A may also be possible, such as using one or more fasteners configured to hold the conductive elements 925A and 935A at a desired distance from each other.

Figure 10A:
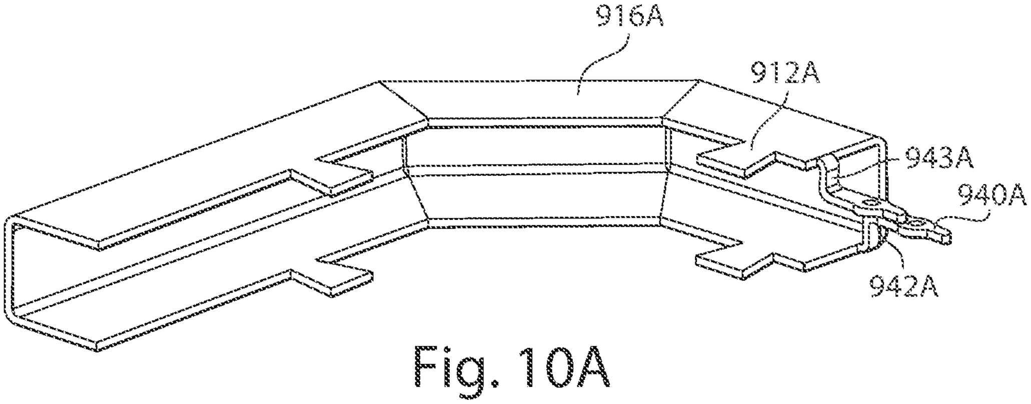
FIGS. 10A-B are, respectively, perspective and front views of an illustrative shield member of the module of the example of FIG. 7A, in accordance with some embodiments.
Figure 10B:
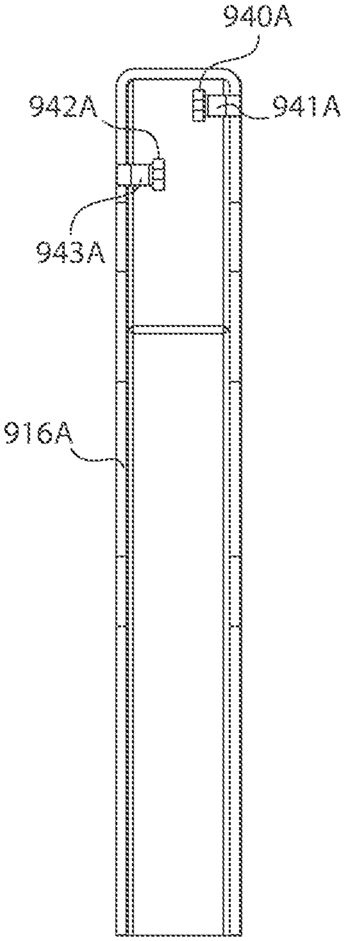

FIGS. 10A-B are, respectively, perspective and front views of the shield member 916A of the example of FIGS. 6A-B, in accordance with some embodiments. As shown in these views, the contact tail 940A is connected to the shield member 916A via a bent segment 941A, so that the contact tail 940A is offset from the side wall of the shield member 916A from which the contact tail 940A extends. Likewise, the contact tail 942A is connected to the shield member 916A via a bent segment 943A so that the contact tail 942A is offset from the side wall of the shield member 916A from which the contact tail 942A extends. This configuration may allow the contact tails 940A and 942A to align with the signal contact tails 920A and 930A, as shown in FIGS. 6A-B.

Figure 11A:
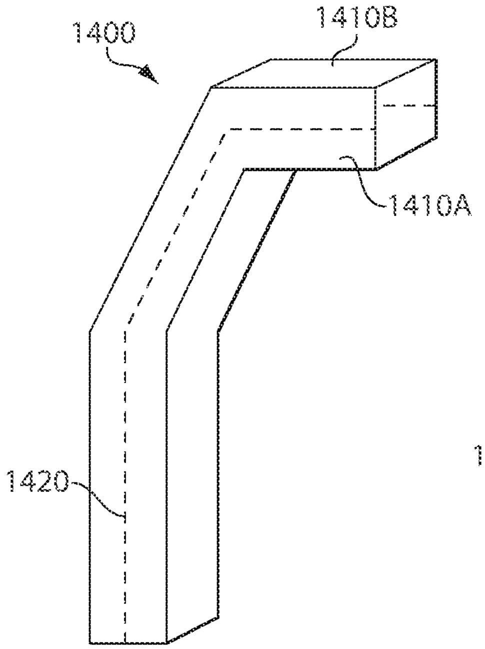
FIGS. 11A-B are, respectively, perspective and cross-sectional views of an illustrative shield member for a module of a connector, in accordance with some embodiments.
Figure 11B:
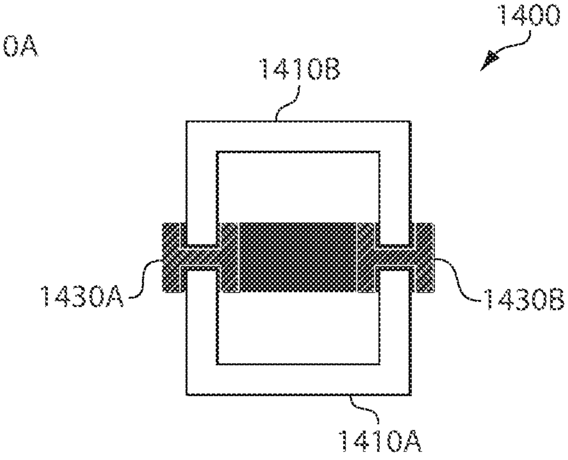

FIGS. 11A-B are, respectively, perspective and cross-sectional views of an illustrative shield member 1400, in accordance with some embodiments. As shown in these views, the illustrative shield member 1400 is formed by assembling together at least two components 1410A-B. In this example, the components 1410A-B form top and bottom halves of the shield member 1400, respectively. However, it should be appreciated that other configurations may also be possible (e.g., left and right halves, top panel with U-shaped bottom channel, inverted U-shaped top channel with bottom panel, etc.), as aspects of the present disclosure are not limited to any particular configuration of shield member components.

Like the shield members 916C and 911C in the example of FIGS. 6A-B, the illustrative shield member 1400 of FIGS. 11A-B also provides a fully shielded signal path, which may advantageously reduce crosstalk between the conductive element(s) enclosed by the shield member 1400 and conductive element(s) outside the shield member 1400. However, the inventors have recognized and appreciated that enclosing a signal path inside a shielded cavity may create unwanted resonances, which may negatively impact signal quality. Accordingly, in some embodiments, one or more portions of lossy material may be electrically coupled to the shield member to reduce unwanted resonances. For instance, in the example of FIG. 11B, lossy portions 1430A-B may be placed between the shield components 1410A-B. The lossy portions may be captured between the shield components and held in place by the same features that attach the shield components to a wafer module.

In some embodiments, the lossy portions 1430A-B may be elongated and may run along an entire length of the shield member 1400. For example, the lossy portion 1430A may run along a seam between the shield components 1410A-B, shown as a dashed line 1420 in FIG. 11A. However, it should be appreciated that the lossy portion 1430 need not run continuously along the dashed line 1420. Rather, in alternative embodiments, the lossy portion 1430 may comprise one or more disconnected portions placed at selected location(s) along the dashed line 1420. Also, aspects of the present disclosure are not limited to the use of lossy portions on two sides of the shield member 1400. In alternative embodiments, one or more lossy portions may be incorporated on only one side, or multiple sides, of the shield member 1400. For example, one or more lossy portions may be placed inside the shield component 1410A on the bottom of the U-shaped channel and likewise for the shield component 1410B.

As a further variation, lossy material may be coupled to the shield member at selected locations along the signal path. For example, lossy material may be coupled to the shield member adjacent transition regions as described above or adjacent the mating contact portions or contact tails. Such regions of lossy material may, for example, be attached to the shield members by pushing a hub on a lossy member through an opening in a shield member. In that case, electrical connection may be formed by direct contact between the lossy material and the shield member. However, lossy members may be electrically coupled in other ways, such as using capacitive coupling.

Alternatively or additionally, lossy material may be placed on the outside of a shield member, such as by applying a lossy conductive coating or overmolding lossy material over the shield members. In some embodiments, a lossy member or members may hold wafer modules together in a wafer or may hold wafers together in a wafer assembly. Lossy members in this configuration, for example, may be overmolded around wafer modules or wafers. Though, connections between shield assemblies need not be formed with lossy members. In some embodiments, conductive members may electrically connect the shield members in different wafer modules or different wafers. Other configurations of lossy material may also be suitable, as aspects of the present disclosure are not limited to any particular configuration, or the use of lossy material at all.

In the wafer modules illustrated in FIGS. 7A-12D, a pair of conductive elements is inserted into a housing. That housing is rigid. In some embodiments, a pair of conductive elements may be routed through a wafer module using cable. In some embodiments, each cable may be in the twin-ax configuration, comprising a pair of signal conductors and an associated ground structure. The ground structure may comprise a foil or braiding wrapped around an insulator in which signal conductors are embedded. In such an embodiment, the cable insulator may serve the same function as a molded housing. However, cable manufacturing techniques may allow for more precise control over the impedance of the signal conductors and/or positioning of the shielding members, providing better electrical properties to the connector.

Figure 12A:
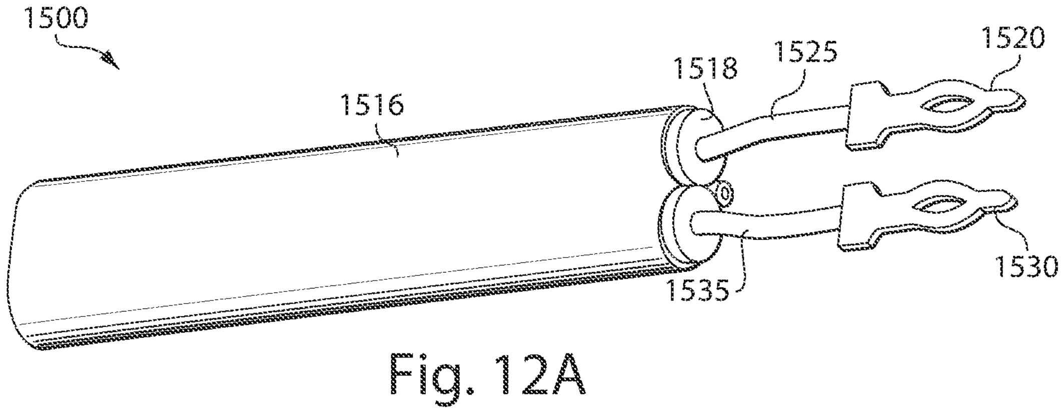
FIGS. 12A-C, 13A-C are perspective views of a tail portion and a mating contact portion, respectively, of an illustrative module of a connector at various stages of manufacturing, in accordance with some embodiments.
Figure 12B:
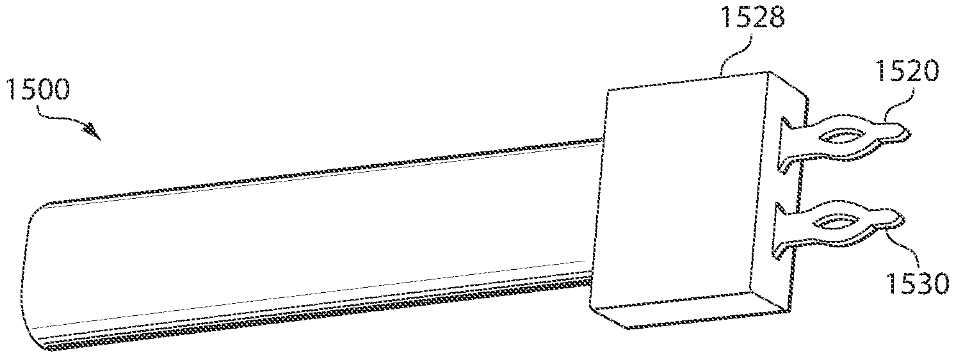
Figure 12C:
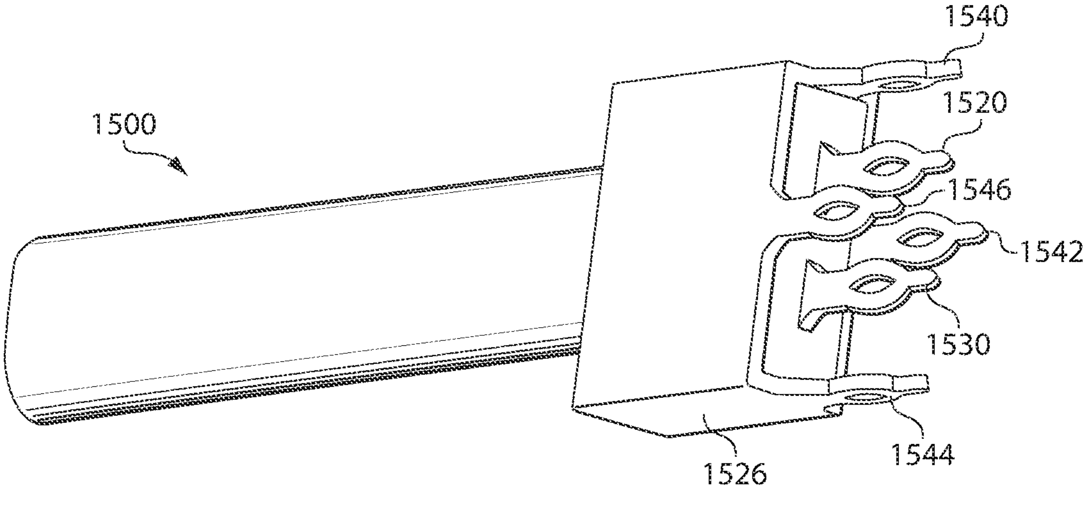

FIGS. 12A-C are perspective views of an illustrative module 1500 at various stages of manufacturing, in accordance with some embodiments using such a cabled configuration. The illustrative module 1500 may be used alone in an electrical connector, or in combination with other modules to form a wafer (like the illustrative wafers 754A-D shown in FIGS. 4A-B) for an electrical connector.

As shown in FIG. 12A, the illustrative module 1500 includes two conductive elements 1525 and 1535 running through a cable insulator 1518. The cable insulator 1518 may be made of an insulative material in any suitable manner. For example, in some embodiments, the cable insulator 1518 may be extruded around the conductive elements 1525 and 1535. A single cable insulator may surround multiple conductors within the cable. In alternative embodiments, the cable insulator 1518 may include two component pieces each surrounding a respective one of the conductive elements 1525 and 1535. The separate component pieces may be held together in any suitable way, such as by an insulative jacket and/or a conducting structure, such as foil.

In some embodiments, the cable insulator 1518 may run along an entire length of the conductive elements 1525 and 1535. Alternatively, the cable insulator 1518 may include disconnected portions disposed at selected locations along the conductive elements 1525 and 1535. The space between two disconnected housing portions may be occupied by air, which is also an insulator. Furthermore, the cable insulator 1518 may have any suitable cross-sectional shape, such as circular, rectangular, oval, etc.

In some embodiments, the conductive elements 1525 and 1535 may be adapted to carry a differential signal and a shield member may be provided to reduce crosstalk between the pair of conductive elements 1525 and 1535 and other conductive elements in a connector. For instance, in the example of FIG. 12A, a shield member 1516 may be provided to enclose the cable insulator 1518 with the conductive elements 1525 and 1535 inserted therein. In some embodiments, the shield member 1516 may be a foil made of a suitable conductive material (e.g., metal), which may be wrapped around the cable insulator 1518. Other types of shield members may also be suitable, such as a rigid structure configured to receive the cable insulator 1518.

As discussed above in connection with FIGS. 6A-B, signal quality may be improved by providing a shield that fully encloses a signal path. Accordingly, in the example of FIG. 12A, the shield 1516 may be wrapped all the way around the cable insulator 1518. However, it should be appreciated that a fully shielded signal path is not required, as in alternative embodiments a signal path may be partially shielded, or not shielded at all. For example, in some embodiments, lossy material may be placed around a signal path, instead of a conductively shield member, to reduce crosstalk between different signal paths.

In some embodiments, each conductive element in a connector may have a contact tail attached thereto. In the example of FIG. 12A, the conductive elements 1525 and 1535 may have, respectively, contact tails 1520 and 1530 attached thereto by welding, brazing, or a compression fitting, or in some other suitable manner. Each contact tail may be adapted to be inserted into a corresponding hole in a printed circuit board so as to form an electrical connection with a corresponding conductive trace in the printed circuit board. The contact tails may be held within an insulative member, which may provide support for the contact tails and ensure that they remain electrically isolated from each other.

FIG. 12B shows the illustrative module 1500 of FIG. 12A at a subsequent stage of manufacturing, where an insulative portion 1528 has been formed around the conductive elements 1525 and 1535 where the contact tails 1520 and 1530 have been attached. In some embodiments, the insulative portion 1528 may be formed by molding non-conductive plastic around the conductive elements 1525 and 1535 and the contact tails 1520 and 1530 so as to maintain a certain spacing between the contact tails 1520 and 1530. This spacing may be selected to match the spacing between corresponding holes on a printed circuit board into which the contact tails 1520 and 1530 are adapted to be inserted. Such spacing may be on the order of 1 mm, but may range, for example, from 0.5 mm to 2 mm.

To fully shield the module, a shield member may be attached over the insulative portion 1528, in accordance with some embodiments. That shield member may be electrically connected to the shield 1516. FIG. 12C shows the illustrative module 1500 of FIGS. 12A-B at a subsequent stage of manufacturing, where a conductive portion 1526 has been formed around the insulative portion 1528. The conductive portion 1526 may be formed of any suitable conductive material (e.g., metal) and may provide shielding to the conductive elements 1525 and 1535 and the contact tails 1520 and 1530. In the embodiment illustrated, the conductive portion 1526 may be formed as a separate sheet that is attached to the insulative portion 1528 using any suitable attachment mechanism, such as a barb or latch, or an opening in the conductive portion 1526 that fits over a projection of the insulative portion 1528. Alternatively or additionally, the conductive portion 1526 may be formed by coating or overmolding a conductive or partially conductive layer onto the insulative portion 1528.

In some embodiments, the conductive portion 1526 may be electrically coupled to one or more contact tails. In the example of FIG. 12C, the conductive portion 1526 may be integrally connected to contact tails 1540, 1542, 1544, and 1546 (e.g., by being stamped out of the same sheet of material). In other embodiments, contact tails may be formed as separate pieces and connected to the conductive portion 1526 in any suitable manner (e.g., by welding).

In some embodiments, the contact tails 1540, 1542, 1544, and 1546 may be adapted to be inserted into holes in a printed circuit board to form electrical connections with ground traces. Furthermore, the conductive portion 1526 may be electrically coupled to the shield member 1516 so that the conductive portion 1526 and the shield member 1516 may together form a ground conductor. Such coupling may be provided in any suitable way, such as a conductive adhesive or filler that contacts both the conductive portion 1526 and the shield member 1516, crimping the shield member 1516 around the conductive portion 1526 or pinching the conductive portion 1526 between the shield member 1516 and the insulative portion 1528. As another example, the shield member 1516 may be soldered, welded, or brazed to the conductive portion 1526.

Figure 13A:
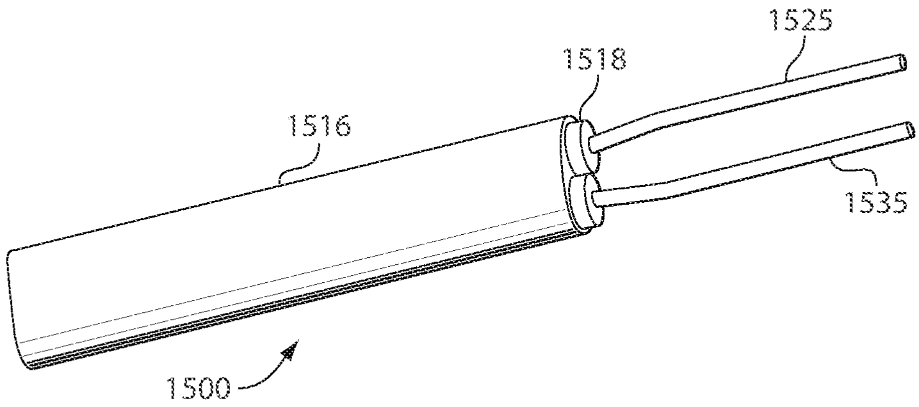
Figure 13B:
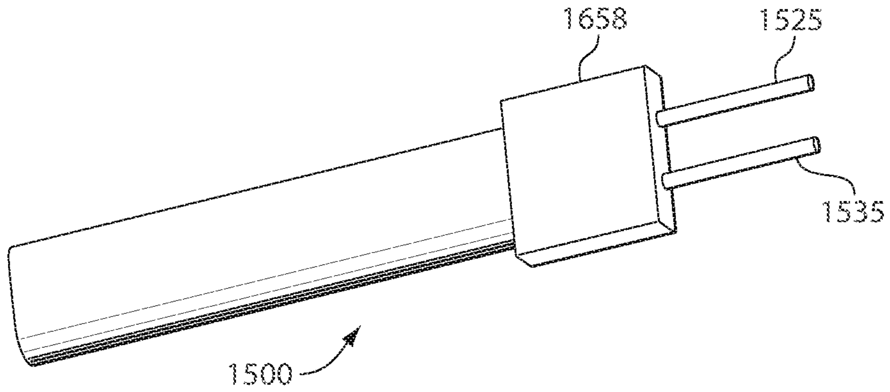
Figure 13C:
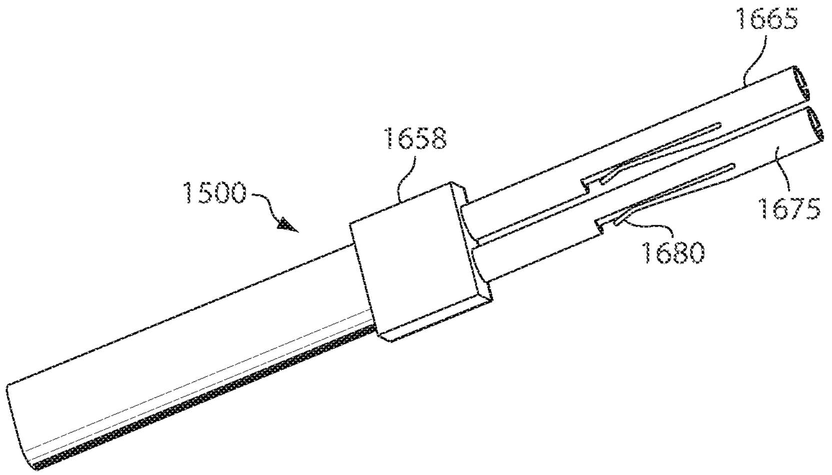

In some embodiments, mating contact portions may also be attached to a wafer used to make wafer modules. FIGS. 13A-C are additional perspective views of the illustrative module 1500 of FIGS. 12A-C at various stages of manufacturing, in accordance with some embodiments. While FIGS. 12A-C show the illustrative module 1500 at one end (e.g., where the module 1500 is adapted to be attached to a printed circuit board), FIGS. 13A-C show the illustrative module 1500 at the opposite end (e.g., where the module 1500 is adapted to mate with another connector, such as a backplane connector). For instance, FIG. 13A shows the opposite ends of the conductive elements 1525 and 1535, the cable insulator 1518, and the shield member 1516 of FIG. 12A. Here the cable insulator 1518, the shield member 1516 and any cable jacket or other portions of the cable are shown stripped away at that end to expose portions of the conductive elements 1525 and 1535 to which structures acting as mating contact portions may be attached.

FIG. 13B shows the illustrative module 1500 of FIG. 13A at a subsequent stage of manufacturing, where an insulative portion 1658 has been formed around the conductive elements 1525 and 1535 where they extend from the cable insulator 1518. In some embodiments, the insulative portion 1658 may be formed by molding non-conductive plastic around the conductive elements 1525 and 1535 so as to maintain a certain spacing between the conductive elements 1525 and 1535. This spacing may be selected to match the spacing between conductive elements of the corresponding connector to which the module 1500 is adapted to mate. The pitch of the mating contact portions may be the same as that of the contact tails described above. However, there is no requirement that the pitch be the same at both the mating contact portions and the contact tails, as any suitable spacing between conductive elements may be used at either interface.

FIG. 13C shows the illustrative module 1500 of FIGS. 13A-B at a subsequent stage of manufacturing, where mating contact portions 1665 and 1675 have been attached to the conductive elements 1525 and 1535, respectively. The mating contact portions 1665 and 1675 may be attached to the conductive elements 1525 and 1535 in any suitable manner (e.g., by welding), and may be adapted to mate with corresponding mating contact portions of another connector.

In the example of FIG. 12C, the mating contact portions 1665 and 1675 are configured as tubes adapted to receive corresponding mating contact portions configured as pins or blades. Alternatively, the tube may be configured to fit within a a larger tube or other structure in a corresponding mating interface.

In some embodiments, the mating contact portion may include a compliant member to facilitate electrical contact to the corresponding mating contact portion of a signal conductor in another connector. In the example of FIG. 12C, each of the mating contact portions 1665 and 1675 has a tab formed thereon, such as the tab 1680 formed on the mating contact portion 1675, which may act as a compliant member. In configurations in which the tube will receive the mating contact portion, the tab 1680 may be biased towards the inside of the tube-shaped mating contact portion 1675, so that a spring force may be generated to press the tab 1680 against a corresponding mating contact portion that is inserted into the mating contact portion 1675. This may facilitates reliable electrical connection between the mating contact portion 1675 and the corresponding mating contact portion of the other connector. Alternatively, in embodiments in which tube-shaped mating contact portion 1675 will fit inside a complementary mating contact structure, the tab may be biased outwards. However, it is not necessary that a tab be used for compliance. In some embodiments, for example, compliance may be achieved by a split in the tube. The split may allow portions of the tube to expand into a larger circumference upon receiving a mating member inserted into the tube or be compressed into a smaller circumference when inserted into another member.

In some embodiments, the tab 1680 may be partially cut out from the mating contact portion 1675 and may remain integrally connected to the mating contact portion 1675. In alternative embodiments, the tab 1680 may be formed as a separate piece and may be attached to the mating contact portion 1675 in some suitable manner (e.g., by welding). Further, though a single tab is visible in FIG. 13C, multiple tabs may be present.

Figure 14A:
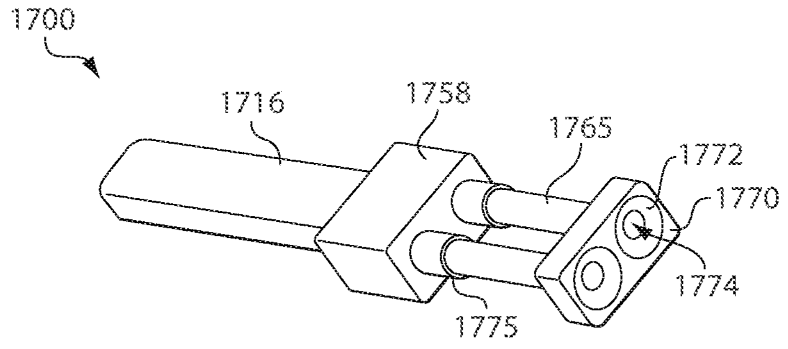
FIGS. 14A-C are perspective views of a mating contact portion of another illustrative module of a connector, in accordance with some embodiments.
Figure 14B:
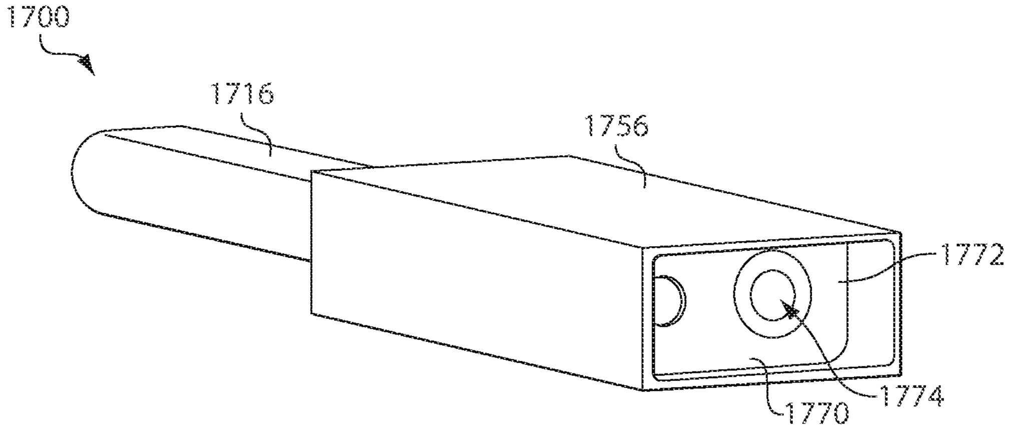
Figure 14C:
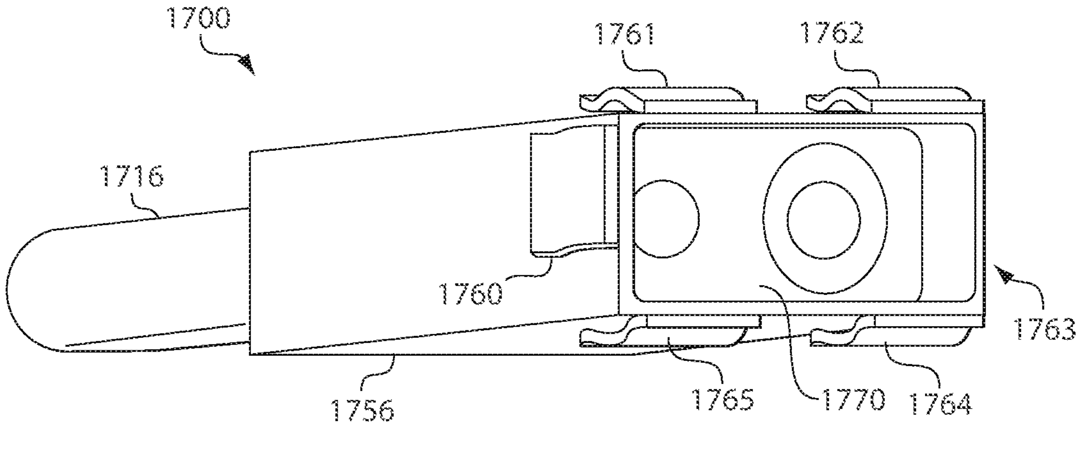

FIGS. 14A-C are perspective views of a module during further steps that may be performed on the mating contact portion shown in FIG. 13C. Elements may be added to provide shielding or structural integrity, or to perform alignment or gathering functions during connector mating to form illustrative module 1700, in accordance with some embodiments.

In some embodiments, the module 1700 may include two conductive elements (not visible) extending from a cable or other insulative housing (not visible). As described above, the conductive elements and insulative housing may be enclosed by a conductive member 1716, which may be made of any suitable conductive material or materials (e.g., metal) and may provide shielding for the enclosed conductive elements. As in the embodiment shown in FIG. 13A, the conductive elements of the module 1700 may be held in place by an insulative portion 1758, and may be electrically coupled to mating contact portions 1765 and 1775, respectively.

In the example of FIG. 14A, the mating contact portions 1765 and 1775 may be configured as partial tubes (e.g., tubes with slits or cutouts of any desired shapes and at any desired locations) adapted to receive or fit into corresponding mating contact portions with any suitable configuration, such as pins, blades, full tubes, partial tubes (with the same configuration as, or different configuration from, the mating contact portions 1765 and 1775), etc.

In some embodiments, a further insulative portion 1770 may be provided at the openings of the mating contact portions 1765 and 1775. The insulative portion 1770 may help to maintain a desired spacing between the mating contact portions 1765 and 1775. This spacing may be selected to match the spacing between mating contact portions of the corresponding connector to which the module 1700 is adapted to mate.

Additionally, the insulative portion 1770 may include one or more features for guiding a corresponding mating contact portion into an opening of one of the mating contact portions 1765 and 1775. For example, a recess 1772 may be provided at the opening 1774 of the mating contact portions 1765. The recess 1772 may shaped as a frustum of a cone, so that during mating a corresponding mating contact portion (e.g., a pin) may be guided into the opening 1774 even if initially the corresponding mating contact portion is not perfectly aligned with the opening 1774. This may prevent damage to the corresponding mating contact portion (e.g., stubbing) due to application of excess force during mating. However, it should be appreciated that aspects of the present disclosure are not limited to the use of any guiding feature.

FIG. 14B shows the illustrative module 1700 of FIG. 14A at a subsequent stage of manufacturing, where a conductive member 1756 has been formed around the insulative portions 1758 and 1770 and the mating contact portions 1765 and 1775. The conductive member 1756 may be formed of any suitable conductive material (e.g., metal) and may provide shielding for the mating contact portions 1765 and 1775.

In some embodiments, a gap may be provided between the mating contact portions 1765 and 1775 and the inside of the conductive member 1756. The gap may be of any suitable size (e.g., 0.5 mm, 0.4 mm, 0.3 mm, 0.2 mm, 0.1 mm, etc.) and may be occupied by air, which is an insulator. The gap may ensure that the compliant members of the mating contact portions are free to move. In some embodiments, the size of the air gap may be selected to provide a desired impedance in the mating contact portion. In some embodiments, lossy material may be included at one or more selected locations within the gap between the mating contact portions 1765 and 1775 and the conductive member 1756, for example, to reduce unwanted resonances.

In some embodiments, the conductive member 1756 may include compliant members that may make electrical contact to a conductive portion, similarly acting as a ground shield in a mating connector. FIG. 14C shows the illustrative module 1700 of FIGS. 14A-B at a subsequent stage of manufacturing, where tabs 1760-1765 have been attached to the conductive member 1756. In this example, the tabs act as compliant members and are positioned to make electrical contact to ground shields in a mating connector. The tabs 1760-1765 may be attached to the conductive member 1756 in any suitable manner (e.g., by welding). In other embodiments, the tabs 1760-1765 may be integrally connected to the conductive member 1756 (e.g., by being stamped out of the same sheet of metal). However, in the embodiment illustrated, the tabs are formed separately and then attached to avoid forming an opening in the box-shaped conductive member 1756 where such a tab would be cut out. The tab may be attached in any suitable way, such as with welding or brazing, or by capturing a portion of the tab member between the conductive member 1756 and another structure in the module, such as the insulative portion 1770.

In some embodiments, the tabs 1760-1765 may be biased away from the conductive member 1756, so that spring forces may be generated to press the tabs 1760-1765 against a corresponding conductive portion of a connector to which the module 1700 is adapted to mate (e.g., a backplane connector). In this example, the conductive member 1756 is box-shaped to fit within a larger box-shaped mating contact structure in a mating connector. The tabs, or other compliant members, may facilitate reliable electrical connection between the conductive member 1756 and the corresponding conductive portion of the mating connector. In some embodiments, the conductive member 1756 and the corresponding conductive portion of the mating connector may be configured as ground conductors (e.g., adapted to be electrically coupled to ground traces in a printed circuit board). Furthermore, the conductive member 1756 may be electrically coupled to the shield member 1716 so that the shield member 1716 may also be grounded.

Figure 15:
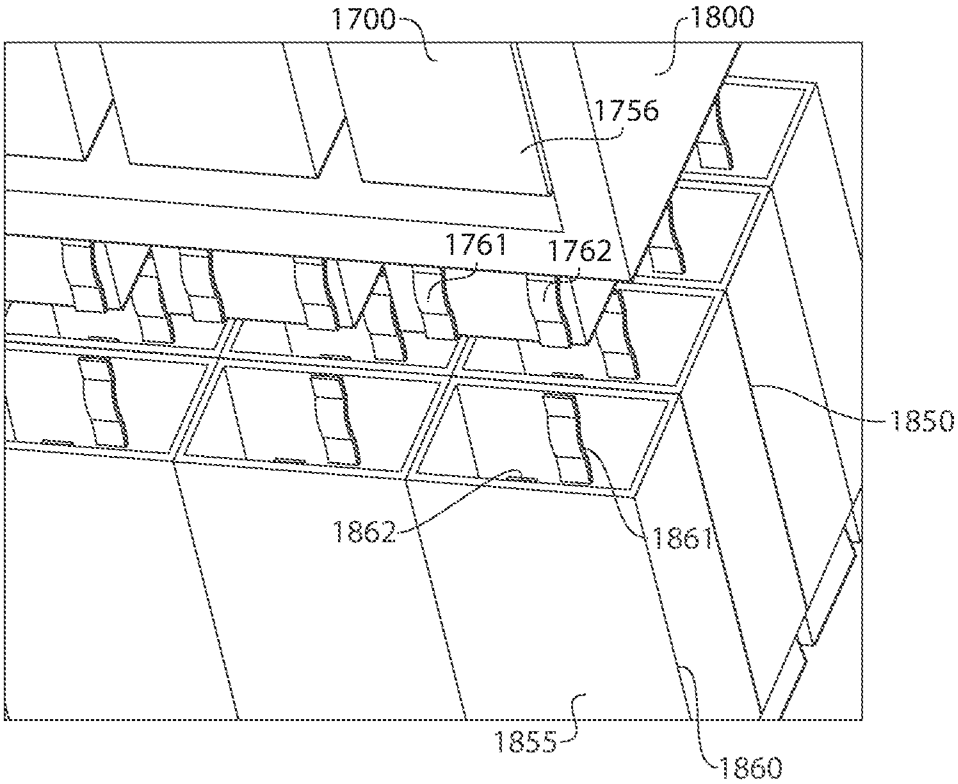
FIG. 15 is an exploded view of portions of a pair of illustrative connectors adapted to mate with each other, in accordance with some embodiments.

An example of a mating connector is illustrated in FIG. 15. FIG. 15 is a partially exploded view of illustrative connectors 1800 and 1850 adapted to mate with each other, in accordance with some embodiments. The connector 1800 may be formed with modules as described above. The modules may each carry a single pair or multiple pairs of signal conductors. Alternatively, each module may carry one or more single-ended signal conductors. These modules may be assembled into wafers, which are then assembled into a connector. Alternatively, the modules may be inserted in or otherwise attached to a support structure to form the connector 1800.

The connector 1850 may similarly be formed of modules, each of which has the same number of signal conductors or signal conductor pairs as a corresponding module in the connector 1800. Alternatively, the connector 1850 maybe formed on a unitary housing or housing portions, each of which is sized to mate with multiple modules in the connector 1800.

In the illustrated example, the connector 1800 may be a daughter card connector, while the connector 1850 may be a backplane connector. When the connectors 1800 and 1850 are mated with each other, and with a daughter card and a backplane, respectively, electrical connections may be formed between the conductive traces in the daughter card and the conductive traces in the backplane, via the conductive elements in the connectors 1800 and 1850.

In the example shown in FIG. 15, the connector 1800 may include the illustrative module 1700 of FIG. 14A-C in combination with identical or different modules. For instance, the modules of the connector 1800 may have similar construction (e.g., same mating interface and board interface) but different right angle turning radii, which may be achieved by different length cable joining the interfaces or in any other suitable way. The modules may be held together in any suitable way, for example, by inserting the modules into an organizer, or by providing engagement features on the modules, where an engagement feature on one module is adapted to engage a corresponding engagement feature on an adjacent module to hold the adjacent modules together.

In some embodiments, the connector 1850 may also include multiple modules. These modules may be identical, or they may be different from one another. An illustrative module 1855 is shown in FIG. 15, having a conductive member 1860 configured to receive the module 1700 of the connector 1800. When the connectors 1800 and 1850 are mated, spring forces may be generated that press the tabs 1760-1765 of the connector 1800 (of which 1761-1762 are visible in FIG. 15) against the inner walls of the conductive member 1860 of the module 1855, which may facilitate reliable electrical connection between the conductive member 1756 and the conductive member 1860.

In some embodiments, one or more tabs may be provided on one or more inner walls of the conductive member 1860 in addition to, or instead of, the tabs on the outside of the conductive member 1756. In the example of FIG. 15, tabs 1861-1862 may be attached respectively to opposing inner walls of the conductive member 1860. When the connectors 1800 and 1850 are mated, spring forces may be generated that press the tabs 1861-1862 against the outside of the conductive member 1756. These additional spring forces may further facilitate reliable electrical connection between the conductive member 1756 and the conductive member 1860.

In some embodiments, having tabs on ground structures in two mating connectors may improve electrical performance of the mated connector. Appropriately placed tabs may reduce the length of any un-terminated portion of a ground conductor. Though the ground conductors are intended to act as a shield that blocks unwanted radiation from reaching signal conductors, the inventors have recognized and appreciated that at frequencies for which a connector as illustrated in FIG. 15 is designed to operate, un-terminated portions of a ground conductor can generate unwanted radiation, which decreases electrical performance of the connector. Without compliant members, such as tabs, to make contact between mating ground structures, one ground structure or the other may have an un-terminated portion with a length approximately equal to the depth of insertion of one connector into the other. The effect of an un-terminated portion may be dependent on its length as well as the frequency of signals passing through the connector. Accordingly, in some embodiments, such tabs may be omitted or, though located at the distal portion of a conductive member that may otherwise be un-terminated, may be set back from the distal edge such that an un-terminated portion remains, though such un-terminated portion may be short enough to have limited impact on the electrical performance of the connector.

In the example illustrated, the tabs 1861-1862 may be located at a distal portion of the conductive member 1860, shown as the top of conductive member 1860 in FIG. 15. Tabs in this configuration form electrical connections that ensure that the distal portion of the conductive member 1860 is electrically connected to the conductive member 1756 when the connectors 1800 and 1850 are fully mated with each other. By contrast, the tabs 1760-1765 of the connector 1800 may be located at the distal end of the conductive member 1756 and may form electrical connections with conductive member 1860, thereby reducing the length of any un-terminated portion of the conductive member 1756.

While various advantages of the tabs 1760-1765, 1861-1862 are discussed above, it should be appreciated that aspects of the present disclosure are not limited to the use of any particular number or configuration of tabs on the conductive member 1756 and/or the conductive member 1860, or to the use of tabs at all. For example, points of contact near the distal ends of two mating conductive members acting as shields can be achieved by providing compliant portions adjacent the mating edges of each conductive member, as illustrated, or providing compliant members on one of the conductive members with different setbacks from the mating edge of that conductive member. Moreover, a specific distribution of compliant members to form points of contact between the conductive members serving as shields is shown as an example, rather than a limitation on suitable distributions of compliant members. For example, FIG. 15 shows that the ground conductive members surrounding pairs of signal conductors in the modules of connector 1800 have compliant members that surround the pair. In the example of FIG. 15 in which the ground conductive members are box-shaped, tabs are disposed on all four sides of the ground conductive members. As shown, where the box is rectangular, there may be more compliant contact members on the longer sides of the box. Two are shown in the example of FIG. 15. In contrast, the ground conductors in connector 1850, though similarly box shaped, have fewer compliant contact members. In the illustrated example, the modules forming connector 1850 have compliant contact members on less than all sides. In the specific example illustrated, they have compliant contact members on only two sides. Moreover, they have only one compliant contact member on each side.

In alternative embodiments, other mechanisms (e.g., torsion beams) may be used to form an electrical connection between the conductive member 1756 and/or the conductive member 1860. Additionally, aspects of the present disclosure are not limited to the use of multiple points of contact to reduce un-terminated stub, as a single point of contact may be suitable in some embodiments. Alternatively, additional points of contact may be present.

Figure 16:
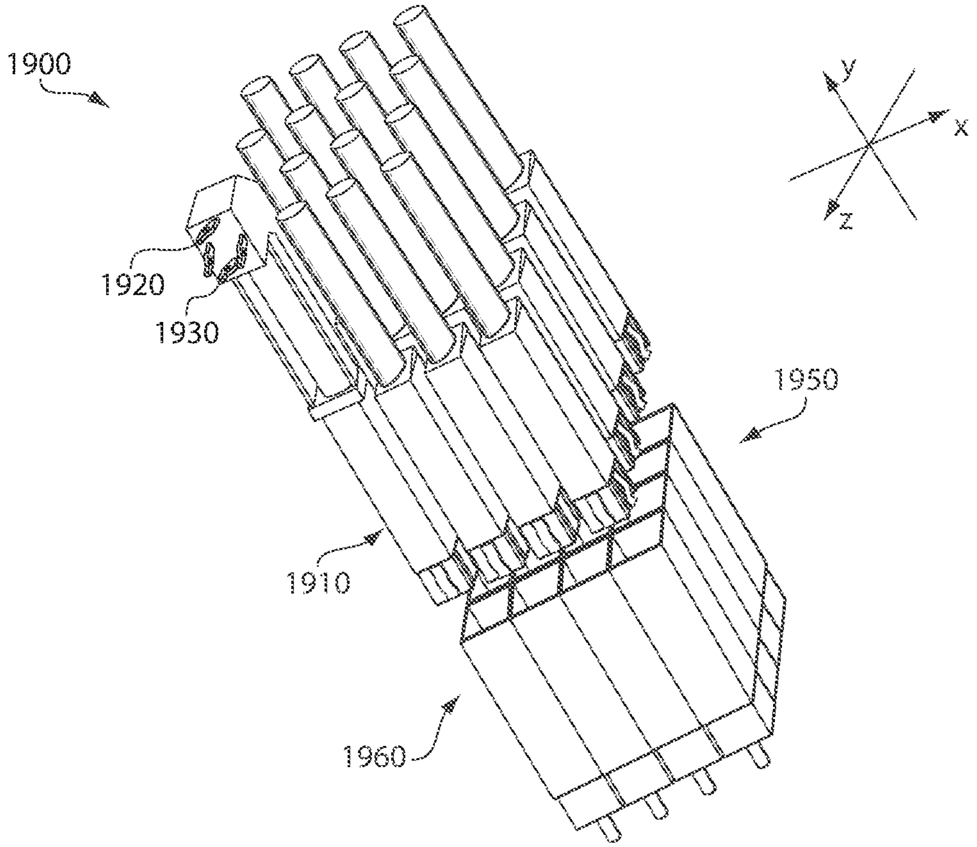
FIG. 16 is an exploded view of another pair of illustrative connectors adapted to mate with each other, in accordance with some embodiments.

FIG. 16 is a partially exploded and partially cutaway view of illustrative connectors 1900 and 1950 adapted to mate with each other, in accordance with some embodiments. These connectors may be manufactured as described above for the connectors 1800 and 1850, or in any other suitable way. In this example, each of the connectors 1900 and 1950 may include 16 modules arranged in a 4×4 grid. For instance, the connector 1900 may include a module 1910 configured to mate with a module 1960 of the connector 1950. The modules may be held together in any suitable way, including via support members to which the modules are attached or into which the modules are inserted.

In some embodiments, the module 1910 may include two conductive elements (not visible) configured as a differential signal pair. Each conductive element may have a contact tail adapted to be inserted into a corresponding hole in a printed circuit board to make an electrical connection with a conductive trace within printed circuit board. The contact tail may be electrically coupled to an elongated intermediate portion, which may in turn be electrically coupled to a mating contact portion adapted to mate with a corresponding mating contact portion of the module 1960 of the connector 1950.

In the example of FIG. 16, the connector 1900 may be a right angle connector configured to be plugged into a printed circuit board disposed in an x-y plane. The conductive elements of the module 1910 may run alongside each other in a y-z plane at the intermediate portions, and may make a right angle turn to be coupled to contact tails 1920 and 1930. The conductive element coupled to the contact tail 1920 may be on the outside of the turn and may therefore be longer than the conductive element coupled to the contact tail 1930.

Figure 17:
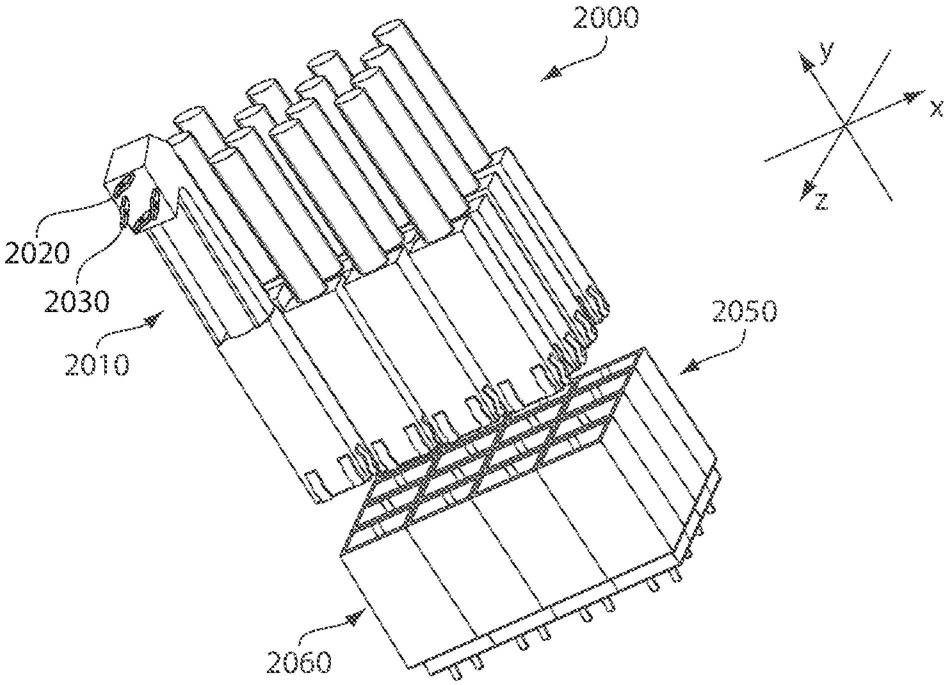
FIG. 17 is an exploded view of yet another pair of illustrative connectors adapted to mate with each other, in accordance with some embodiments.

FIG. 17 is an exploded view of illustrative connectors 2000 and 2050 adapted to mate with each other, in accordance with some embodiments. Like the illustrative connectors 1900 and 1950, the connectors 2000 and 2050 may each include 16 modules arranged in a 4×4 grid. For instance, the connector 2000 may include a module 2010 configured to mate with a module 2060 of the connector 2050.

Like the connector 1900 in the example of FIG. 16, the connector 2000 may be a right angle connector configured to be plugged into a printed circuit board disposed in an x-y plane. However, the conductive elements of the module 2010 may run alongside each other in an x-y plane at the intermediate portions (as opposed to a y-z plane as in the example of FIG. 16). As a result, the conductive elements of the module 2010 may first make a right angle turn within the same x-y plane occupied by the intermediate portions, and then make another right angle turn out of that x-y plane, in the positive z direction, to be coupled to contact tails 2020 and 2030.

In the embodiment of FIG. 17, the intermediate portions of the conductive elements of each pair are spaced from each other in a direction that is parallel to an edge of the printed circuit board to which the connector 2000 is attached. In the embodiment of FIG. 16, the conductive elements of the pair are spaced from each other in a direction that is perpendicular to a surface of the printed circuit board. The difference in orientation may change the aspect ratio of the connector for a given number of pairs per column. As can be seen, the four pairs, oriented as in FIG. 16, occupy more rows than the same number of pairs in the embodiment of FIG. 17. The configuration of FIG. 16 may be useful in an electronic system in which there is ample room between adjacent daughter cards for the wider configuration, but less space along the edge of the printed circuit board for the longer configuration of FIG. 17. Conversely, for an electronic system with limited space between adjacent printed circuit boards but more room along the edge, the configuration of FIG. 17 may be preferred.

Alternatively, the embodiment of FIG. 17 may be used for broadside coupling of the intermediate portions while the intermediate portions may be edge coupled in the embodiment of FIG. 16. Broadside coupling of the intermediate portions of pairs oriented as illustrated in FIG. 17, may introduce less skew in the conductors of a pair than edge coupling. With broadside coupling, the intermediate portions may turn through the same radius of curvature such that their physical lengths are equalized. Edge coupling, on the other hand, may facilitate routing of traces to the contact tails of the connector.

As illustrated, however, both configurations may result in the contact tails of a pair being aligned with each other along the Y-axis, corresponding to the column dimension. In this configuration, because the broad sides of the conductive elements are parallel with the Y-axis, the contact tails are edge-coupled, meaning that edges of the conductive elements are adjacent. In contrast, when broadside coupling is used broad surfaces of the conductive elements are adjacent. Such a configuration may be achieved through a transition region in the embodiment of FIG. 17, in which the conductive elements have transition regions as described above in connection with FIG. 9C.

Figure 18A:
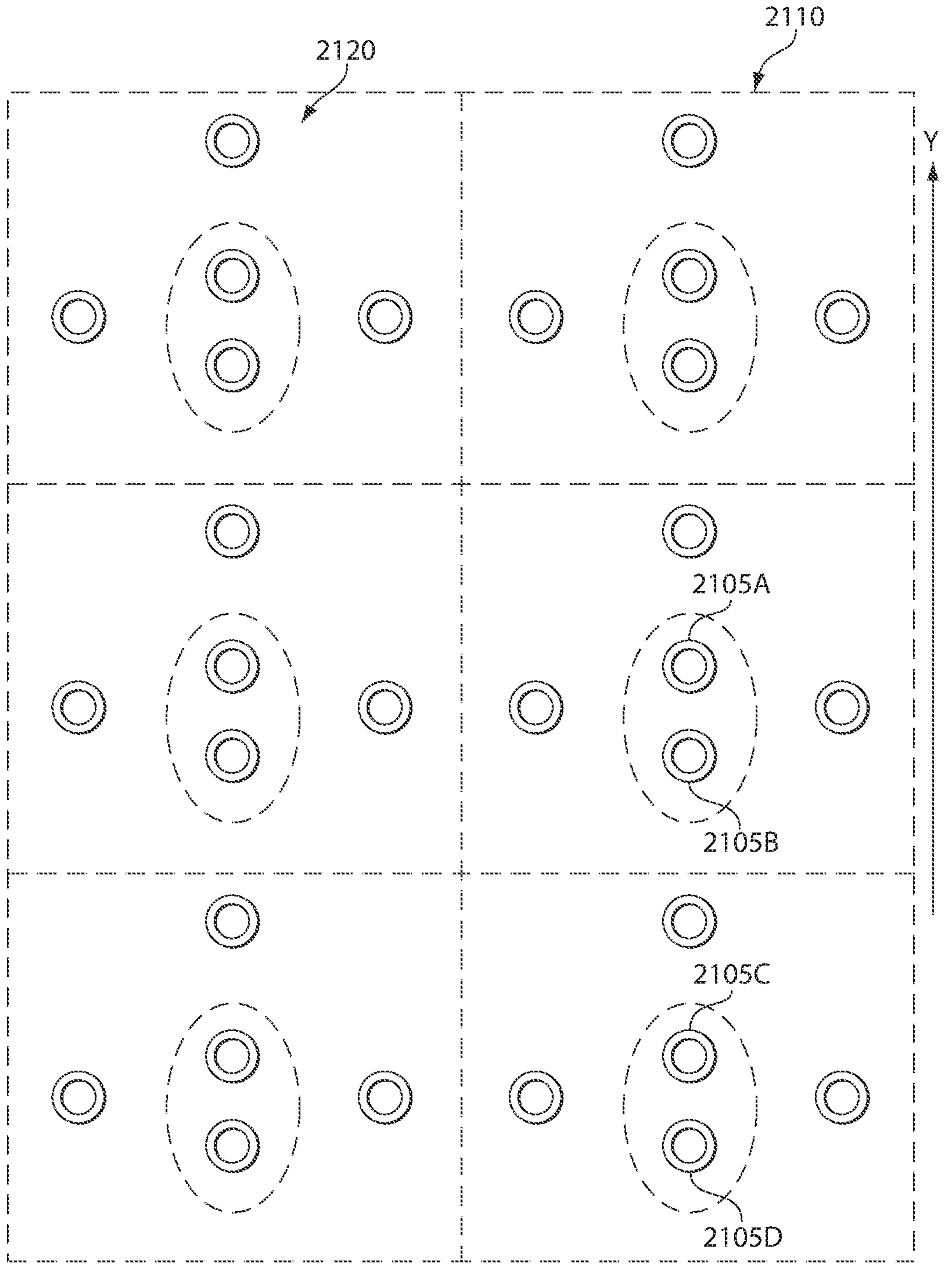
FIGS. 18A-B shows vias disposed in columns on an illustrative printed circuit board, routing channels between the columns of vias, and traces running in the routing channels, in accordance with some embodiments.
Figure 18B:
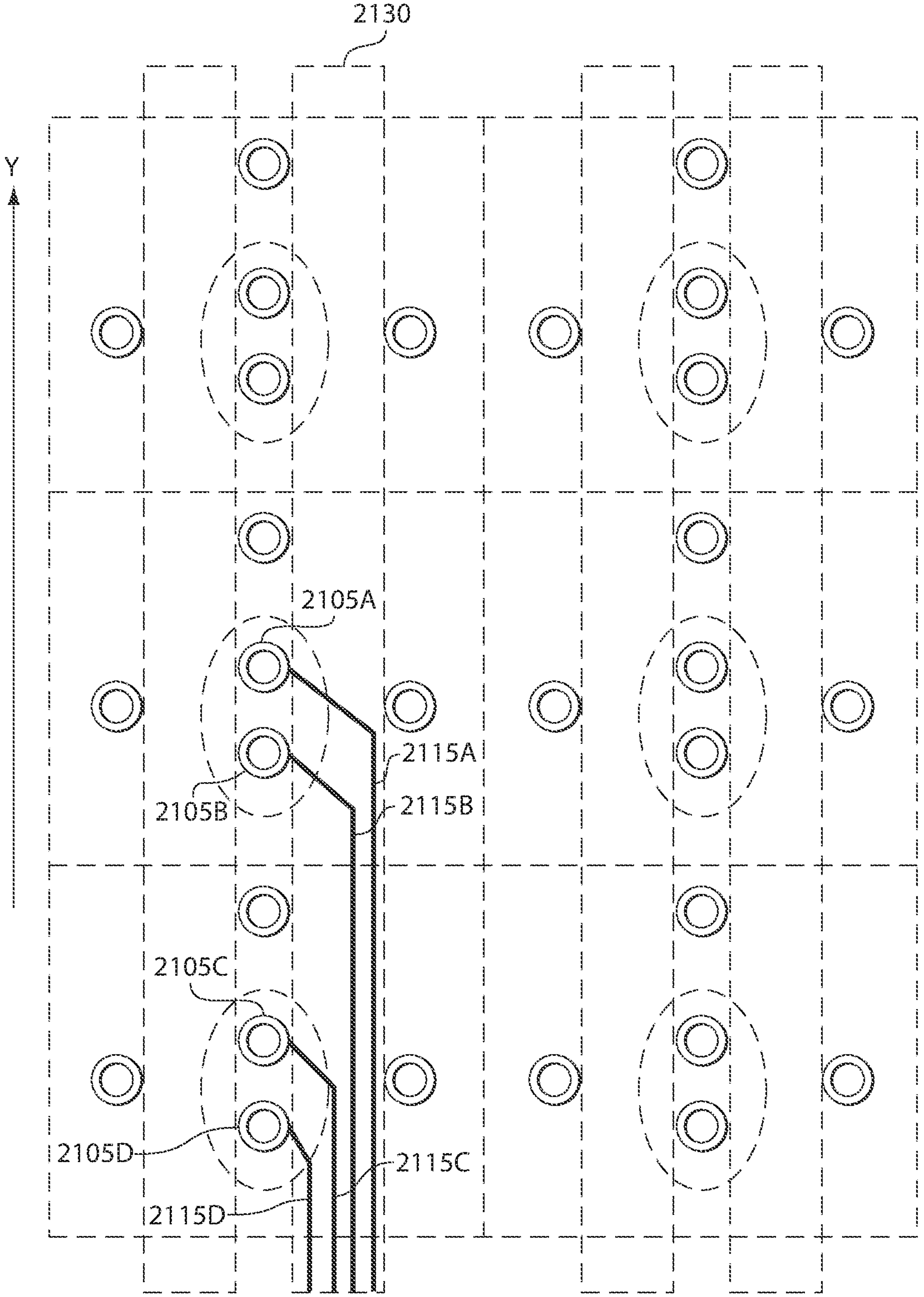

Providing edge coupling of contact tails may provide routing channels within a printed circuit board to which a connector is attached. As illustrated, in both the embodiment of FIG. 16 and FIG. 17, the contact tails in a column are aligned in the Y-direction. When vias are formed in a daughter card to receive contact tails, those vias will similarly be aligned in a column in the Y-direction. That direction may correspond to the direction in which traces are routed from electronics attached to the printed circuit board to a connector at the edge of the board. Examples of vias (e.g., vias 2105A-C) disposed in columns (e.g., columns 2110 and 2120) on a printed circuit board, and the routing channels between the columns are shown in FIG. 18A, in accordance with some embodiments. Examples of traces (e.g., traces 2115A-D) running in these routing channels (e.g., channel 2130) are illustrated in FIG. 18B, in accordance with some embodiments. Having routing channels as illustrated in FIG. 18B may allow traces for multiple pairs (e.g., the pair 2115A-B and the pair 2115C-D) to be routed on the same layer of the printed circuit board. As more pairs are routed on the same level, the number of layers in the printed circuit board may be reduced, which can reduce the overall cost of the electronic assembly.

Although details of specific configurations of conductive elements, housings, and shield members are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings. For example, the illustrative mating interface features described in connection with FIGS. 13A-C may be used with the illustrative connector modules shown in FIGS. 6A-B.

As discussed above, lossy material may be placed at one or more locations in a connector in some embodiments, for example, to reduce crosstalk. Any suitable lossy material may be used. Materials that conduct, but with some loss, over the frequency range of interest are referred to herein generally as "lossy" materials. Electrically lossy materials can be formed from lossy dielectric and/or lossy conductive materials. The frequency range of interest depends on the operating parameters of the system in which such a connector is used, but will generally have an upper limit between about 1 GHz and 25 GHz, although higher frequencies or lower frequencies may be of interest in some applications. Some connector designs may have frequency ranges of interest that span only a portion of this range, such as 1 to 10 GHz or 3 to 15 GHz or 3 to 6 GHz.

Electrically lossy material can be formed from material traditionally regarded as dielectric materials, such as those that have an electric loss tangent greater than approximately 0.003 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain particles or regions that are sufficiently dispersed that they do not provide high conductivity or otherwise are prepared with properties that lead to a relatively weak bulk conductivity over the frequency range of interest. Electrically lossy materials typically have a conductivity of about 1 siemens/meter to about $1\times10^7$ siemens/meter and preferably about 1 siemens/meter to about 30,000 siemens/meter. In some embodiments material with a bulk conductivity of between about 10 siemens/meter and about 100 siemens/meter may be used. As a specific example, material with a conductivity of about 50 siemens/meter may be used. However, it should be appreciated that the conductivity of the material may be selected empirically or through electrical simulation using known simulation tools to determine a suitable conductivity that provides both a suitably low crosstalk with a suitably low insertion loss.

Electrically lossy materials may be partially conductive materials, such as those that have a surface resistivity between 1 Ω/square and 106 Ω/square. In some embodiments, the electrically lossy material has a surface resistivity between 1 Ω/square and 103 Ω/square. In some embodiments, the electrically lossy material has a surface resistivity between 10 Ω/square and 100 Ω/square. As a specific example, the material may have a surface resistivity of between about 20 Ω/square and 40 Ω/square.

In some embodiments, electrically lossy material is formed by adding to a binder a filler that contains conductive particles. In such an embodiment, a lossy member may be formed by molding or otherwise shaping the binder into a desired form. Examples of conductive particles that may be used as a filler to form an electrically lossy material include carbon or graphite formed as fibers, flakes or other particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure or can otherwise be used to position the filler material. In some embodiments, the binder may be a thermoplastic material such as is traditionally used in the manufacture of electrical connectors to facilitate the molding of the electrically lossy material into the desired shapes and locations as part of the manufacture of the electrical connector. Examples of such materials include LCP and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Ticona. A lossy material, such as lossy conductive carbon filled adhesive preform, such as those sold by Techfilm of Billerica, Massachusetts, US may also be used. This preform can include an epoxy binder filled with carbon particles. The binder surrounds carbon particles, which acts as a reinforcement for the preform. Such a preform may be inserted in a wafer to form all or part of the housing. In some embodiments, the preform may adhere through the adhesive in the preform, which may be cured in a heat treating process. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy member may be manufactured by stamping a preform or sheet of lossy material. For example, an insert may be formed by stamping a preform as described above with an appropriate patterns of openings. However, other materials may be used instead of or in addition to such a preform. A sheet of ferromagnetic material, for example, may be used.

However, lossy members also may be formed in other ways. In some embodiments, a lossy member may be formed by interleaving layers of lossy and conductive material, such as metal foil. These layers may be rigidly attached to one another, such as through the use of epoxy or other adhesive, or may be held together in any other suitable way. The layers may be of the desired shape before being secured to one another or may be stamped or otherwise shaped after they are held together.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. For example, examples of techniques are described for improving signal quality at the mating interface of an electrical interconnection system. These techniques may be used alone or in any suitable combination. Furthermore, the size of a connector may be increased or decreased from what is shown. Also, it is possible that materials other than those expressly mentioned may be used to construct the connector. As another example, connectors with four differential signal pairs in a column are used for illustrative purposes only. Any desired number of signal conductors may be used in a connector.

Manufacturing techniques may also be varied. For example, embodiments are described in which the daughter card connector 116 is formed by organizing a plurality of wafers onto a stiffener. It may be possible that an equivalent structure may be formed by inserting a plurality of shield pieces and signal receptacles into a molded housing.

As another example, connectors are described that are formed of modules, each of which contains one pair of signal conductors. It is not necessary that each module contain exactly one pair or that the number of signal pairs be the same in all modules in a connector. For example, a 2-pair or 3-pair module may be formed. Moreover, in some embodiments, a core module may be formed that has two, three, four, five, six, or some greater number of rows in a single-ended or differential pair configuration. Each connector, or each wafer in embodiments in which the connector is waferized, may include such a core module. To make a connector with more rows than are included in the base module, additional modules (e.g., each with a smaller number of pairs such as a single pair per module) may be coupled to the core module.

As an example of another variation, FIGS. 12A-C illustrate a module using cables to produce conductive elements connecting contact tails and mating contact portions. In such embodiments, wires are encased in insulation as part of manufacture of the cables. In other embodiments, a wire may be routed through a passageway in a preformed insulative housing. In such an embodiment, for example, a housing for a wafer or wafer module may be molded or otherwise formed with openings. Wires may then be threaded through the passageway and terminated as shown in connection with FIGS. 12A-C, 16A-C, and 17A-C.

Furthermore, although many inventive aspects are shown and described with reference to a daughter board connector having a right angle configuration, it should be appreciated that aspects of the present disclosure is not limited in this regard, as any of the inventive concepts, whether alone or in combination with one or more other inventive concepts, may be used in other types of electrical connectors, such as backplane connectors, cable connectors, stacking connectors, mezzanine connectors, I/O connectors, chip sockets, etc.

What is claimed is:

1. A connector module comprising:

at least one conductive element defining a signal path, each conductive element of the at least one conductive element comprising a mating contact portion, a contact tail, and an intermediate portion extending between the mating contact portion and the contact tail;

one or more shield members disposed on four sides of the signal path so as to at least partially enclose the signal path; and one or more lossy portions coupled to the one or more shield members at one or more locations along the signal path.

2. The connector module of claim 1, wherein:

the one or more lossy portions comprise a lossy portion at least partially disposed inside the one or more shield members.

3. The connector module of claim 1, wherein:

the signal path comprises a transition region between the intermediate portion and the mating contact portion of the at least one conductive element; and the one or more locations along the signal path comprise the transition region.

4. The connector module of claim 1, wherein:

the signal path comprises a transition region between the intermediate portion and the contact tail of the at least one conductive element; and the one or more locations along the signal path comprise the transition region.

5. The connector module of claim 1, wherein:

the one or more lossy portions comprise a lossy portion elongating along a length of the signal path.

6. The connector module of claim 5, wherein:

the lossy portion extends along an entire length of the signal path.

7. The connector module of claim 1, wherein:

the one or more lossy portions comprise a lossy portion at least partially disposed outside the one or more shield members.

8. The connector module of claim 1, wherein:

the one or more shield members comprise a gap; and the one or more lossy portions comprise a lossy portion at least partially disposed in the gap.

9. The connector module of claim 8, wherein:

the one or more shield members comprise a pair of gaps facing each other; and the lossy portion is at least partially disposed in the pair of gaps.

10. The connector module of claim 1, wherein:

the one or more shield members are a plurality of shield members that cooperate to at least partially enclosing the signal path.

11. The connector module of claim 1, wherein:

the one or more shield members comprises a first shield member on a first side of the connector module and a second shield member on a second side of the connector module;

the first shield member comprises segments disposed on three sides of the signal path;

the second shield member comprises segments disposed on three sides of the signal path;

the first shield member and the second shield member are disposed such that the segments of the first shield member and the segments of the second shield member are disposed on four sides of a space comprising the signal path; and the one or more lossy portions are disposed within the space.

12. A subassembly for an electrical connector, the subassembly comprising:

a plurality of pairs of conductive elements, each conductive element of the plurality of pairs of conductive elements comprising a mating contact portion, a contact tail, and an intermediate portion extending between the mating contact portion and the contact tail;

a plurality of shield members configured to bound a plurality of spaces on four sides so as to at least partially surround each of the plurality of spaces, wherein each of the plurality of spaces comprises a respective pair of the plurality of pairs of conductive elements; and one or more lossy portions at least partially disposed within the plurality of spaces.

13. The subassembly of claim 12, wherein:

the one or more lossy portions comprise a lossy portion that hold the plurality of pairs of conductive elements in a column.

14. The subassembly of claim 13, wherein:

the lossy portion is molded over the plurality of shield members.

15. The subassembly of claim 12, wherein:

the plurality of shield members are configured to provide openings into the plurality of spaces; and the one or more lossy portions are at least partially disposed in the plurality of openings.

16. The subassembly of claim 12, wherein:

each conductive element of the plurality of pairs of conductive elements comprises a transition region between the intermediate portion and the contact tail such that the contact tails in the pairs are edge coupled; and the one or more lossy portions are disposed at the transition regions of respective pairs of the plurality of pairs of conductive elements.

17. The subassembly of claim 12, wherein:

each conductive element of the plurality of pairs of conductive elements comprises a transition region between the intermediate portion and the mating contact portion such that the mating contact portions in the pairs are edge coupled; and the one or more lossy portions are coupled to the plurality of shield members at one or more locations at which the plurality of shield members at least partially surround the transition regions of respective pairs of the plurality of pairs of conductive elements.

18. The subassembly of claim 12, wherein:

the plurality of shield members cooperate to bound a plurality of spaces, each of the plurality of spaces comprising a pair of the plurality of pairs of conductive elements; and the one or more lossy portions are disposed at least in part within the plurality of spaces.

19. A subassembly for an electrical connector, the subassembly comprising:

a plurality of signal paths, each of the plurality of signal paths comprising at least one conductive element;

a plurality of shield members configured to bound the plurality of signal paths on four sides so as to at least partially enclose each signal path of the plurality of signal paths; and one or more lossy portions coupled to the plurality of shield members at one or more locations.

20. The subassembly of claim 19, wherein:

each of the plurality of shield members comprises one or more components separated by one or more gaps; and the one or more lossy portions are at least partially disposed in the gaps of the plurality of shield members.

21. The subassembly of claim 19, wherein:

the one or more lossy portions are at least partially enclosed by the plurality of shield members.

22. The subassembly of claim 19, wherein:

the one or more locations comprise locations along lengths of the plurality of signal paths.

23. The subassembly of claim 19, wherein:

for each of the plurality of signal paths, the at least one conductive element each comprises a mating contact portion, a contact tail, an intermediate portion extending between the mating contact portion and the contact tail, and one or more transition regions between the intermediate portion and the mating contact portion and/or the contact tail; and the one or more locations comprise the one or more transition regions of the plurality of signal paths.

24. The subassembly of claim 19, wherein:

the plurality of shield members comprise at least a first shield member with a first concave portion and a second shield member with a second concave portion opposing the first concave portion so as to bound a respective signal path of the plurality of signal paths on four sides;

the respective signal path is disposed within a space bounded by the first concave portion and the second concave portion; and the respective lossy portion is disposed within the space bounded by the first concave portion and the second concave portion.

* * * * *